(12) United States Patent
Ishii et al.

(10) Patent No.: US 10,481,883 B2
(45) Date of Patent: Nov. 19, 2019

(54) INTER-FILE OPTIMIZATION PROGRAM GENERATION METHOD, AND PROGRAM GENERATOR

(71) Applicant: FUJITSU LIMITED, Kawasaki-shi, Kanagawa (JP)

(72) Inventors: Kuninori Ishii, Odawara (JP); Toshihiro Suzuki, Mishima (JP); Naoki Sueyasu, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 152 days.

(21) Appl. No.: 15/664,459

(22) Filed: Jul. 31, 2017

(65) Prior Publication Data

US 2018/0052668 A1 Feb. 22, 2018

(30) Foreign Application Priority Data

Aug. 22, 2016 (JP) .................................. 2016-162005

(51) Int. Cl.
 *G06F 9/45* (2006.01)
 *G06F 8/41* (2018.01)
 *G06F 9/445* (2018.01)
 *G06F 8/54* (2018.01)

(52) U.S. Cl.
 CPC ............ *G06F 8/4441* (2013.01); *G06F 8/443* (2013.01); *G06F 8/54* (2013.01); *G06F 9/44521* (2013.01)

(58) Field of Classification Search
 CPC ............................... G06F 8/4441; G06F 8/443
 USPC ........................................ 717/140–146, 151
 See application file for complete search history.

(56) References Cited

U.S. PATENT DOCUMENTS

| 5,778,212 A | * | 7/1998 | Dehnert | G06F 8/443 717/146 |
| 5,812,855 A | * | 9/1998 | Hiranandani | G06F 8/433 707/999.01 |
| 6,041,180 A | * | 3/2000 | Perks | G06F 8/4434 717/151 |

(Continued)

FOREIGN PATENT DOCUMENTS

| JP | 9-274570 | 10/1997 |
| JP | 2003-208317 | 7/2003 |

OTHER PUBLICATIONS

Kuhl et al, "object-oriented LL(1) parser generator", ACM, pp. 33-40 (Year: 2000).*

(Continued)

*Primary Examiner* — Anil Khatri
(74) *Attorney, Agent, or Firm* — Staas & Halsey LLP

(57) ABSTRACT

An information processor including a memory; and a processor coupled to the memory and method thereof. The processor is configured to store first identification information of a first source file corresponding to an object file that is not linked, judge whether second identification information of a second source file specified as a target of compilation is stored in the memory, and generate an object file through compilation on a third source file where the second identification information of the second source file is stored in the memory. The processor is also configured to perform inter-file optimization on the second source file and the third source file to generate a plurality of intermediate files and generate a plurality of object files through compilation on the plurality of generated intermediate files.

9 Claims, 31 Drawing Sheets

(56) References Cited

U.S. PATENT DOCUMENTS

| | | | | |
|---|---|---|---|---|
| 6,678,886 B2* | 1/2004 | Kumon | | G06F 8/445 |
| | | | | 717/135 |
| 6,829,253 B1* | 12/2004 | Koorapaty | | H04B 7/2684 |
| | | | | 370/514 |
| 7,228,531 B1* | 6/2007 | Langhammer | | G06F 17/5045 |
| | | | | 717/146 |
| 7,472,375 B2* | 12/2008 | Ye | | G06F 8/52 |
| | | | | 717/106 |
| 7,689,975 B2* | 3/2010 | Popp | | G06F 8/423 |
| | | | | 717/123 |
| 7,703,086 B2* | 4/2010 | Odinak | | G06Q 20/341 |
| | | | | 717/146 |
| 7,814,467 B2* | 10/2010 | Li | | G06F 8/443 |
| | | | | 717/136 |
| 7,818,730 B1* | 10/2010 | Ryan | | G06F 8/34 |
| | | | | 717/140 |
| 7,996,825 B2* | 8/2011 | Chakrabarti | | G06F 8/4441 |
| | | | | 717/140 |
| 8,464,234 B2* | 6/2013 | Novillo | | G06F 8/42 |
| | | | | 717/140 |
| 8,694,978 B1* | 4/2014 | Rus | | G06F 11/3608 |
| | | | | 717/140 |
| 9,146,719 B2* | 9/2015 | Lozano | | G06F 8/443 |
| 9,256,437 B2* | 2/2016 | Arakawa | | G06F 9/3851 |
| 9,395,986 B2* | 7/2016 | Miyoshi | | G06F 9/30058 |
| 9,817,643 B2* | 11/2017 | He | | G06F 8/41 |
| 10,083,017 B2* | 9/2018 | Ji | | G06F 8/48 |
| 10,289,394 B2* | 5/2019 | Huang | | G06F 8/447 |
| 2014/0380287 A1* | 12/2014 | Carrillo | | G06F 8/41 |
| | | | | 717/140 |

OTHER PUBLICATIONS

Chen et al, "Type-Preserving Compilation for Large-Scale Optimizing Object-Oriented Compilers", ACM, pp. 183-192 (Year: 2008).*

Cui et al, "Extendable Pattern-Oriented Optimization Directives", ACM, pp. 1-37 (Year: 2012).*

Roy et al, "Improving FlowInsensitive Solutions for NonSeparable Dataflow Problems", ACm, pp. 211-216 (Year: 2008).*

Calder et al, "Value Profiling", IEEE, pp. 259-269 (Year: 1997).*

Yang et al, "A GPGPU Compiler for Memory Optimization and Parallelism Management", ACM, pp. 86-97 (Year: 2010).*

Park et al, "An Evaluation of Different Modeling Techniques for Iterative Compilation", ACM, pp. 65-74 (Year: 2011).*

* cited by examiner

FIG. 6

```
all: x.exe y.exe z.exe w.exe x.exe: a.o b.o
        fcc a.o b.o -o x.exe -Klto y.exe: a.o c.o
        fcc a.o c.o -o y.exe -Klto z.exe: a.o d.o
        fcc a.o d.o -o z.exe -Klto w.exe: d.o e.o
        fcc d.o e.o -o w.exe a.o: a.c
        fcc a.c -o a.o -c -Klto b.o: b.c
        fcc b.c -o b.o -c -Klto c.o: c.c
        fcc c.c -o c.o -c -Klto d.o: d.c
        fcc d.c -o d.o -c e.o: e.c
        fcc e.c -o e.o -c -Klto
```

FIG. 7

```
fcc a.c -o a.o -c -Klto
fcc b.c -o b.o -c -Klto
fcc a.o b.o -o x.exe -Klto
fcc c.c -o c.o -c -Klto
fcc a.o c.o -o y.exe -Klto
fcc d.c -o d.o -c
fcc a.o d.o -o z.exe -Klto
fcc e.c -o e.o -c -Klto
fcc d.o e.o -o w.exe
```

FIG. 12

| LINK TIME OPTIMIZATION OBJECT FILE | SOURCE FILE NOT DESIRABLE TO BE COMPILED |
|---|---|
| "a.o" | "a.c" |
| "b.o" | "b.c" |
| "c.o" | "c.c" |

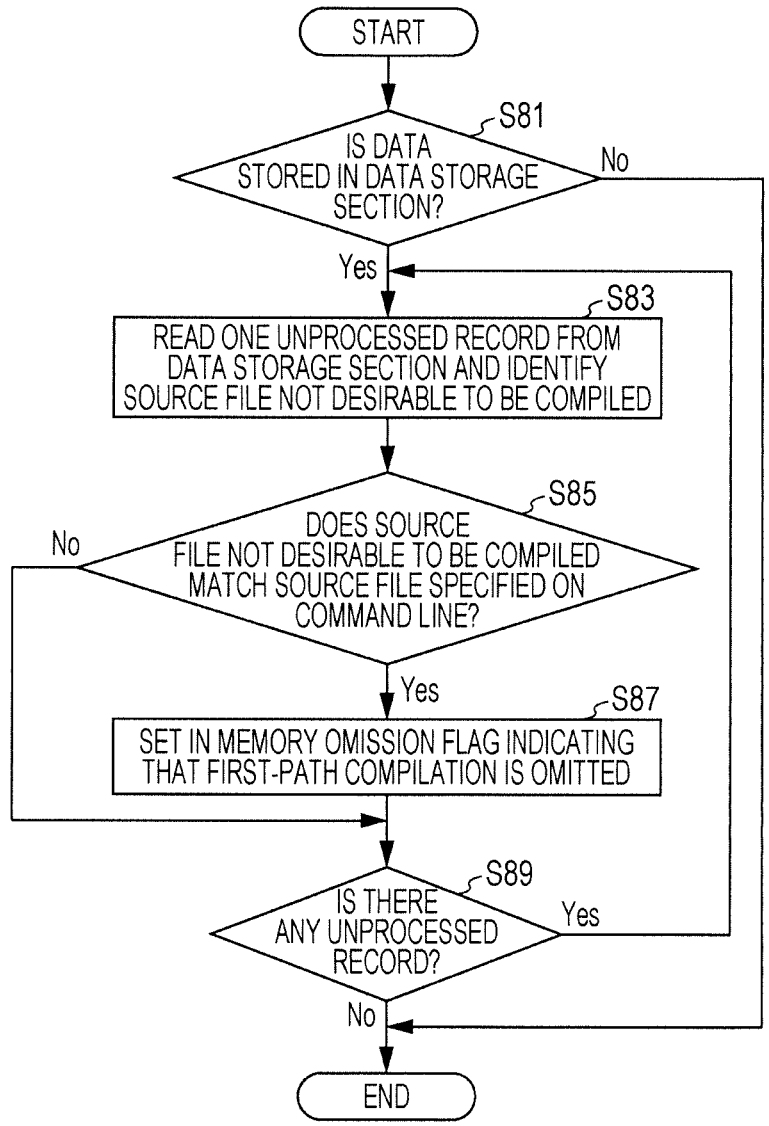

(1) $ fcc a.c -o a.o -c -Klto
(2) $ fcc b.c -o b.o -c -Klto
(3) $ fcc a.o b.o -o x.exe -Klto
(4) $ fcc c.c -o c.o -c -Klto
(5) $ fcc a.o c.o -o y.exe -Klto
(6) $ fcc d.c -o d.o -c
(7) $ fcc a.o d.o -o z.exe -Klto
(8) $ fcc e.c -o e.o -c -Klto
(9) $ fcc d.o e.o -o w.exe

FIG. 19

|     | NORMAL COMPILATION AND LINKING | FIRST EMBODIMENT |
|-----|--------------------------------|------------------|
| (1) | "a.c"                          | —                |
| (2) | "b.c"                          | —                |
| (3) | INTER-FILE OPTIMIZATION INTERMEDIATE FILE CORRESPONDING TO "a.c"<br>INTER-FILE OPTIMIZATION INTERMEDIATE FILE CORRESPONDING TO "b.c" | INTER-FILE OPTIMIZATION INTERMEDIATE FILE CORRESPONDING TO "a.c"<br>INTER-FILE OPTIMIZATION INTERMEDIATE FILE CORRESPONDING TO "b.c" |
| (4) | "c.c"                          | —                |
| (5) | INTER-FILE OPTIMIZATION INTERMEDIATE FILE CORRESPONDING TO "a.c"<br>INTER-FILE OPTIMIZATION INTERMEDIATE FILE CORRESPONDING TO "c.c" | INTER-FILE OPTIMIZATION INTERMEDIATE FILE CORRESPONDING TO "a.c"<br>INTER-FILE OPTIMIZATION INTERMEDIATE FILE CORRESPONDING TO "c.c" |
| (6) | "d.c"                          | "d.c"            |
| (7) | INTER-FILE OPTIMIZATION INTERMEDIATE FILE CORRESPONDING TO "a.c" | INTER-FILE OPTIMIZATION INTERMEDIATE FILE CORRESPONDING TO "a.c" |
| (8) | "e.c"                          | "e.c"            |
| (9) | —                              | —                |

FIG. 25

| SOURCE FILE |
|---|
| a.c |
| b.c |
| ⋮ |

FIG. 26

| LINK TIME OPTIMIZATION OBJECT FILE | SOURCE FILE NOT DESIRABLE TO BE COMPILED | INTER-FILE OPTIMIZATION TARGET SOURCE FILE | EXECUTION FLAG |
|---|---|---|---|
| "a.o" | "a.c" | "a.c b.c" | 0 |
| "a.o" | "a.c" | "a.c c.c" | 0 |
| "a.o" | "a.c" | "a.c" | 0 |
| "b.o" | "b.c" | "a.c b.c" | 0 |
| "c.o" | "c.c" | "a.c c.c" | 0 |

FIG. 30

| LINK TIME OPTIMIZATION OBJECT FILE | SOURCE FILE NOT DESIRABLE TO BE COMPILED | INTER-FILE OPTIMIZATION TARGET SOURCE FILE | EXECUTION FLAG |
|---|---|---|---|
| "a.o" | "a.c" | "a.c b.c" | 0 |
| "a.o" | "a.c" | "a.c c.c" | 0 |
| "a.o" | "a.c" | "a.c" | 0 |
| "b.o" | "b.c" | "a.c b.c" | 1 |
| "c.o" | "c.c" | "a.c c.c" | 1 |

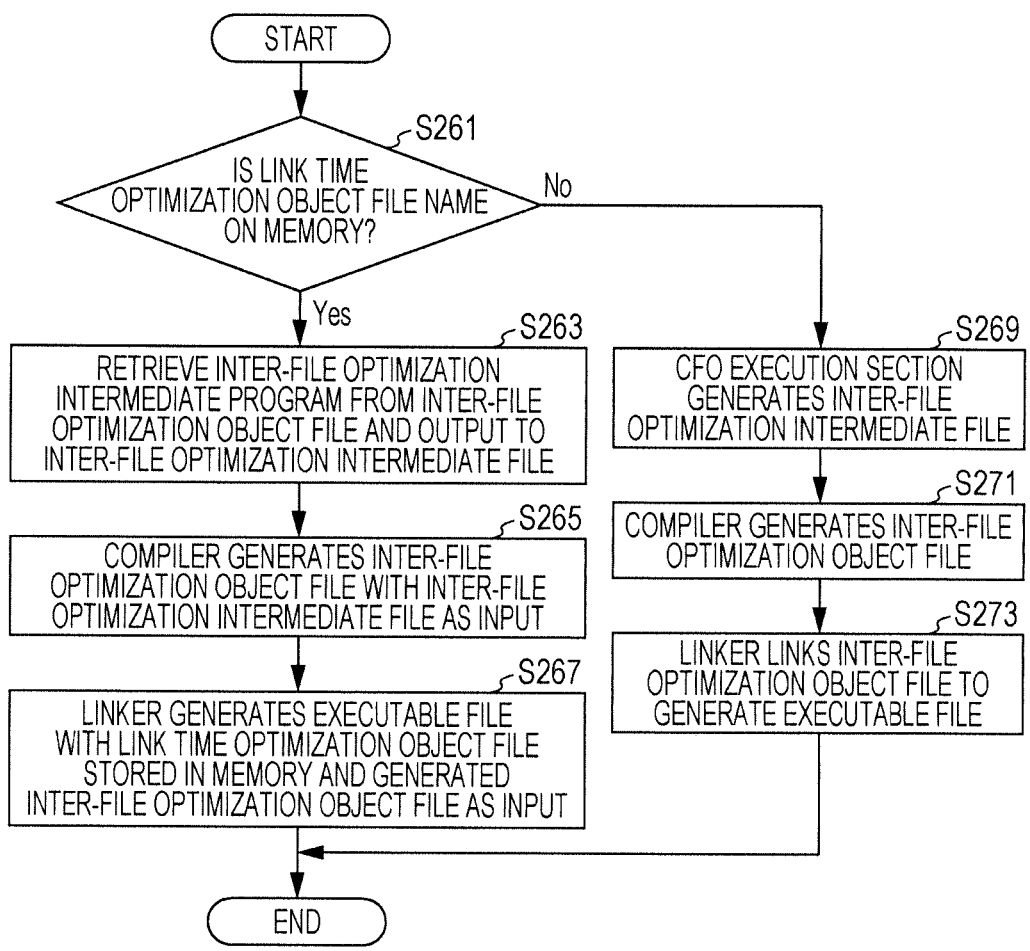

FIG. 35

|     | NORMAL COMPILATION AND LINKING | SECOND EMBODIMENT |
| --- | --- | --- |
| (1) | "a.c" | "a.c" |
| (2) | "b.c" | INTER-FILE OPTIMIZATION INTERMEDIATE FILE CORRESPONDING TO "b.c" |
| (3) | INTER-FILE OPTIMIZATION INTERMEDIATE FILE CORRESPONDING TO "a.c"<br>INTER-FILE OPTIMIZATION INTERMEDIATE FILE CORRESPONDING TO "b.c" | INTER-FILE OPTIMIZATION INTERMEDIATE FILE CORRESPONDING TO "a.c" |
| (4) | "c.c" | INTER-FILE OPTIMIZATION INTERMEDIATE FILE CORRESPONDING TO "c.c" |
| (5) | INTER-FILE OPTIMIZATION INTERMEDIATE FILE CORRESPONDING TO "a.c"<br>INTER-FILE OPTIMIZATION INTERMEDIATE FILE CORRESPONDING TO "c.c" | INTER-FILE OPTIMIZATION INTERMEDIATE FILE CORRESPONDING TO "a.c" |
| (6) | "d.c" | "d.c" |
| (7) | INTER-FILE OPTIMIZATION INTERMEDIATE FILE CORRESPONDING TO "a.c" | INTER-FILE OPTIMIZATION INTERMEDIATE FILE CORRESPONDING TO "a.c" |
| (8) | "e.c" | "e.c" |
| (9) | — | — |

INTER-FILE OPTIMIZATION PROGRAM GENERATION METHOD, AND PROGRAM GENERATOR

CROSS-REFERENCE TO RELATED APPLICATION

This application is based upon and claims the benefit of priority of the prior Japanese Patent Application No. 2016-162005, filed on Aug. 22, 2016, the entire contents of which are incorporated herein by reference.

FIELD

The embodiments discussed herein are related to a compilation technology.

BACKGROUND

In some cases, optimization among source files (such as inline deployment, constant propagation, or the like) may be useful for a source file including a source program described in a programming language such as C, C++, or Fortran. Optimization among source files is performed after the entire source files are confirmed based on object files that are made ready during linking. Optimization among source files during linking is called link time optimization (LTO).

When link time optimization is performed, an object file that includes an object code generated through compilation (hereinafter referred to as first-path compilation) and source program information is generated. Then, optimization is performed using the source program information in the object file during linking. Then, recompilation (hereinafter referred to as second-path compilation) is performed on a result of the optimization. An object code resulting from the recompilation is linked, so that build is completed.

When link time optimization is not performed, an object file including a result of first-path compilation is linked. However, since an object file including a result of second-path compilation is linked when link time optimization is performed, the object file including the result of the first-path compilation is not linked.

For this reason, first-path compilation is useless processing when link time optimization is performed. Nevertheless, such a method is adopted to be able to deal with both of the case in which link time optimization is performed and the case in which link time optimization is not performed. However, this contributes to extended time till an executable file is generated. In the conventional technique, no consideration is given to such a problem in link time optimization.

Related techniques are disclosed, for example, in Japanese Laid-open Patent Publication Nos. 2003-208317 and 9-274570.

SUMMARY

According to an aspect of the embodiments, an information processor includes: a memory; and a processor coupled to the memory and the processor configured to: store first identification information of a first source file corresponding to an object file that is not linked; judge whether second identification information of a second source file specified as a target of compilation is stored in the memory, and generate an object file through compilation on a third source file other than the second source file where the second identification information of the second source file is stored in the memory; perform inter-file optimization on the second source file and the third source file other than the second source file to generate a plurality of intermediate files; and generate a plurality of object files through compilation on the plurality of generated intermediate files.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data to be stored in an execution rule storage section;

FIG. 7 is a diagram illustrating an example of makefile command to be generated;

FIG. 12 is a diagram illustrating an example of data to be stored in the data storage section of the first embodiment;

FIG. 13 is a diagram illustrating a processing flow of a process to be performed by a compilation judgment section;

FIG. 14 is a diagram illustrating an example of an omission flag;

FIG. 19 is a diagram illustrating compilation omission in the first embodiment;

FIG. 25 is a diagram illustrating an example of data to be registered in a list;

FIG. 26 is a diagram illustrating an example of data to be stored in a data storage section in the second embodiment;

FIG. 30 is a diagram illustrating an example of data to be stored in the data storage section in the second embodiment;

FIG. 33 is a diagram illustrating an example of data to be stored in a memory;

FIG. 34 is a diagram illustrating a processing flow of a process to be performed by a CFO control section;

FIG. 35 is a diagram illustrating compilation omission by the second embodiment.

DESCRIPTION OF EMBODIMENTS

Figure 1:
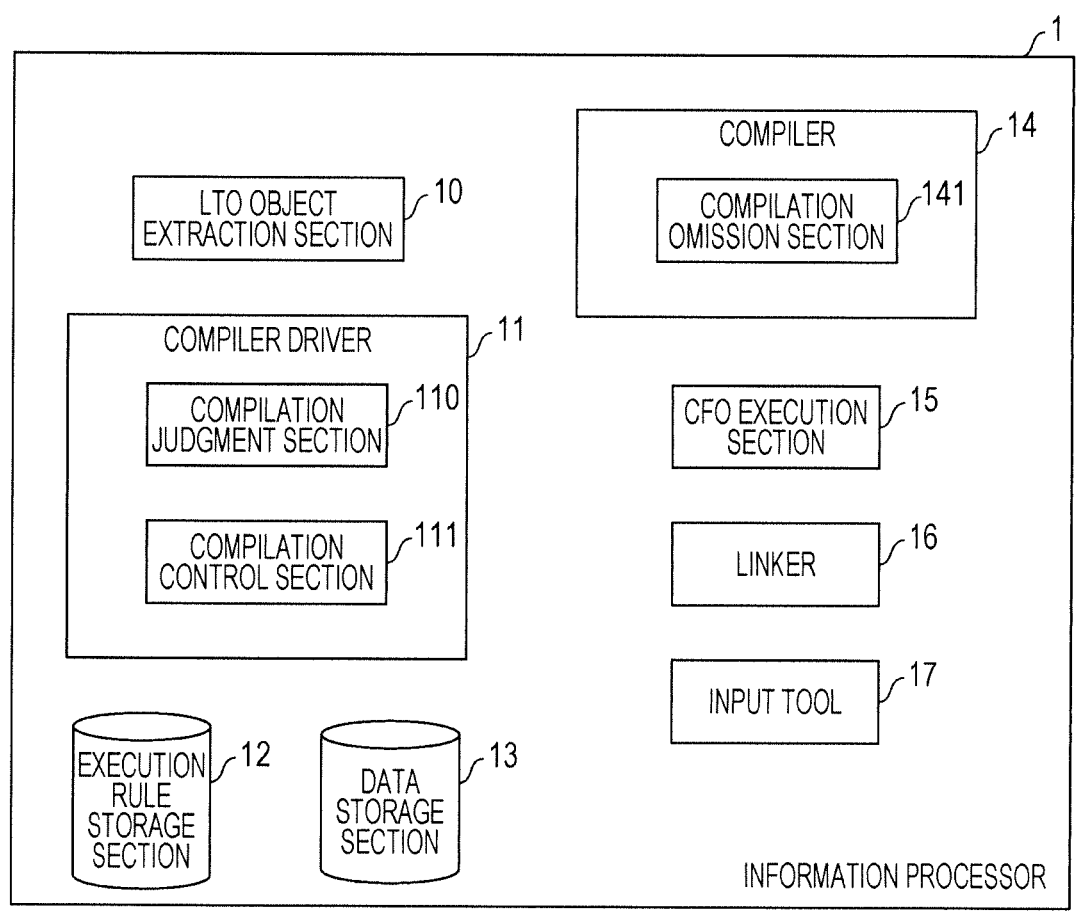
FIG. 1 is a functional block diagram of an information processor in a first embodiment.

FIG. 1 is a functional block diagram of an information processor 1 in a first embodiment. The information processor 1 includes a link time optimization (LTO) object extraction section 10, a compiler driver 11, an execution rule storage section (an execution rule storage) 12, a data storage section (a data storage) 13, a compiler 14, a cross-file optimization (CFO) execution section (a cross-file optimization execution storage) 15, a linker 16, and an input tool 17. The execution rule storage section 12 and the data storage section 13 may be a volatile storage device such as a random-access memory (RAM) or may be configured by a nonvolatile storage device such as a hard disk drive (HDD) or a flash memory, or the like. The compiler driver 11 includes a compilation judgment section 110 and a compilation control section 111. The compiler 14 includes a compilation omission section 141.

The LTO object extraction section 10 extracts an object file including an object code that is not linked. An object file is a file including an object code and a source program information file. An object code is a program including an instruction sequence to be generated through compilation on a source file (which is herein narrow-sense compilation. This also applies to the following unless otherwise specified). A source program information file includes source program information (source program itself, for example).

The compiler driver 11 is invoked from a command line to control the compiler 14, the CFO execution section 15, and the linker 16. The compilation judgment section 110 judges whether or not to perform compilation, based on a list of object files including object codes that are not linked. The compilation control section 111 controls execution of compilation on a source file corresponding to an object file that is not linked. A source file is a file including a source program.

The compiler 14 performs compilation and the compilation omission section 141 performs a process to omit execution of compilation. Compilation includes a process to generate an object code and a process to generate an object file. Note that broad-sense compilation refers to a series of processes to generate an object file from a source file, and that broad-sense compilation includes narrow-sense compilation.

The CFO execution section 15 performs inter-file optimization to generate an inter-file optimization intermediate file. Inter-file optimization is optimization across a plurality of source programs. An inter-file optimization intermediate file includes an inter-file optimization intermediate program. An inter-file optimization intermediate program is a program in a format that may be read by the compiler 14 and includes a source program or intermediate information.

The linker 16 performs a link process to generate an executable file. An executable file includes an instruction in a machine language interpreted by a processor (central processing unit (CPU) or a micro-processing unit (MPU)) and other data or the like.

The input tool 17 is a tool to execute a make command according to data of makefile stored in the execution rule storage section 12.

Figure 2:
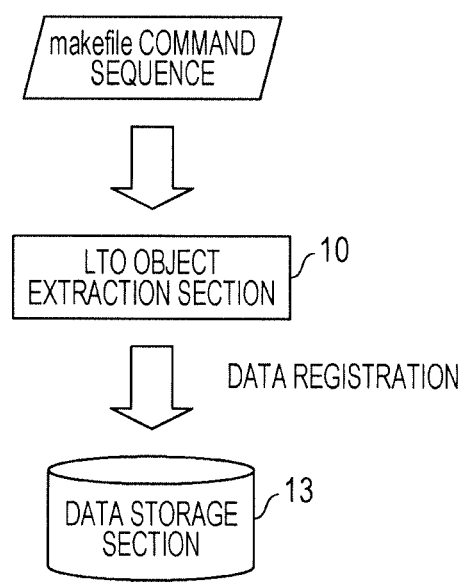
FIG. 2 is a diagram illustrating an overview of operations of the information processor in the first embodiment.
Figure 3:
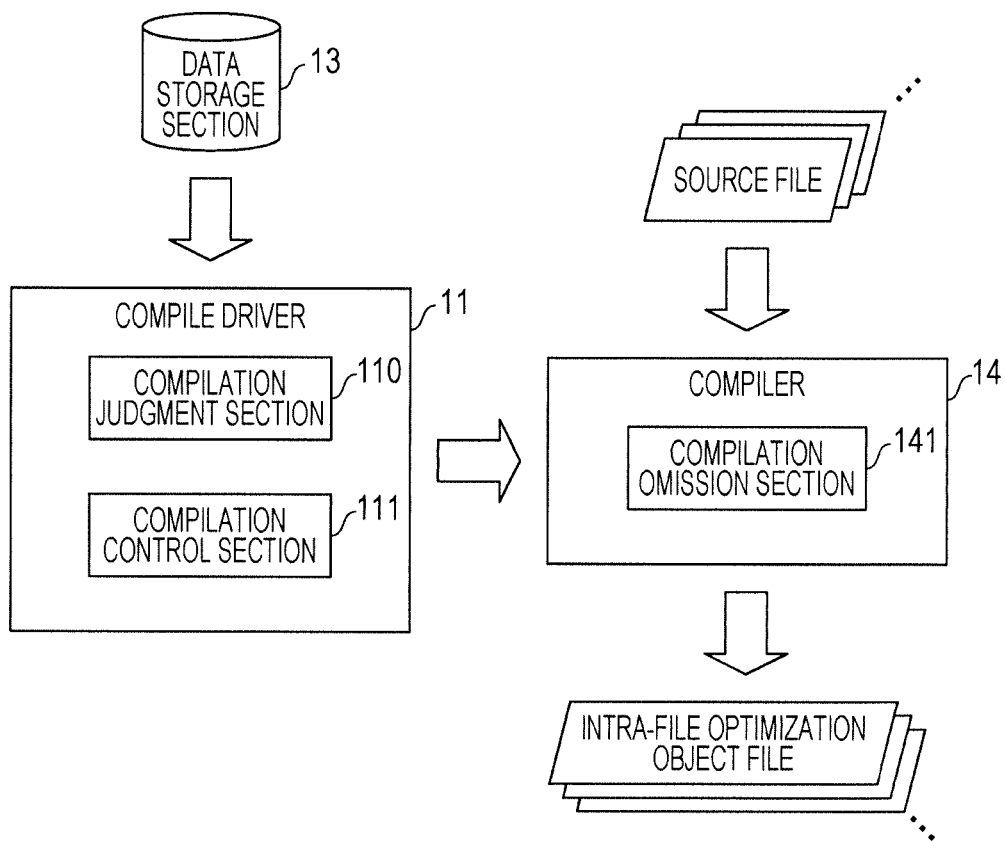
FIG. 3 is a diagram illustrating the overview of the operations of the information processor in the first embodiment.
Figure 4:
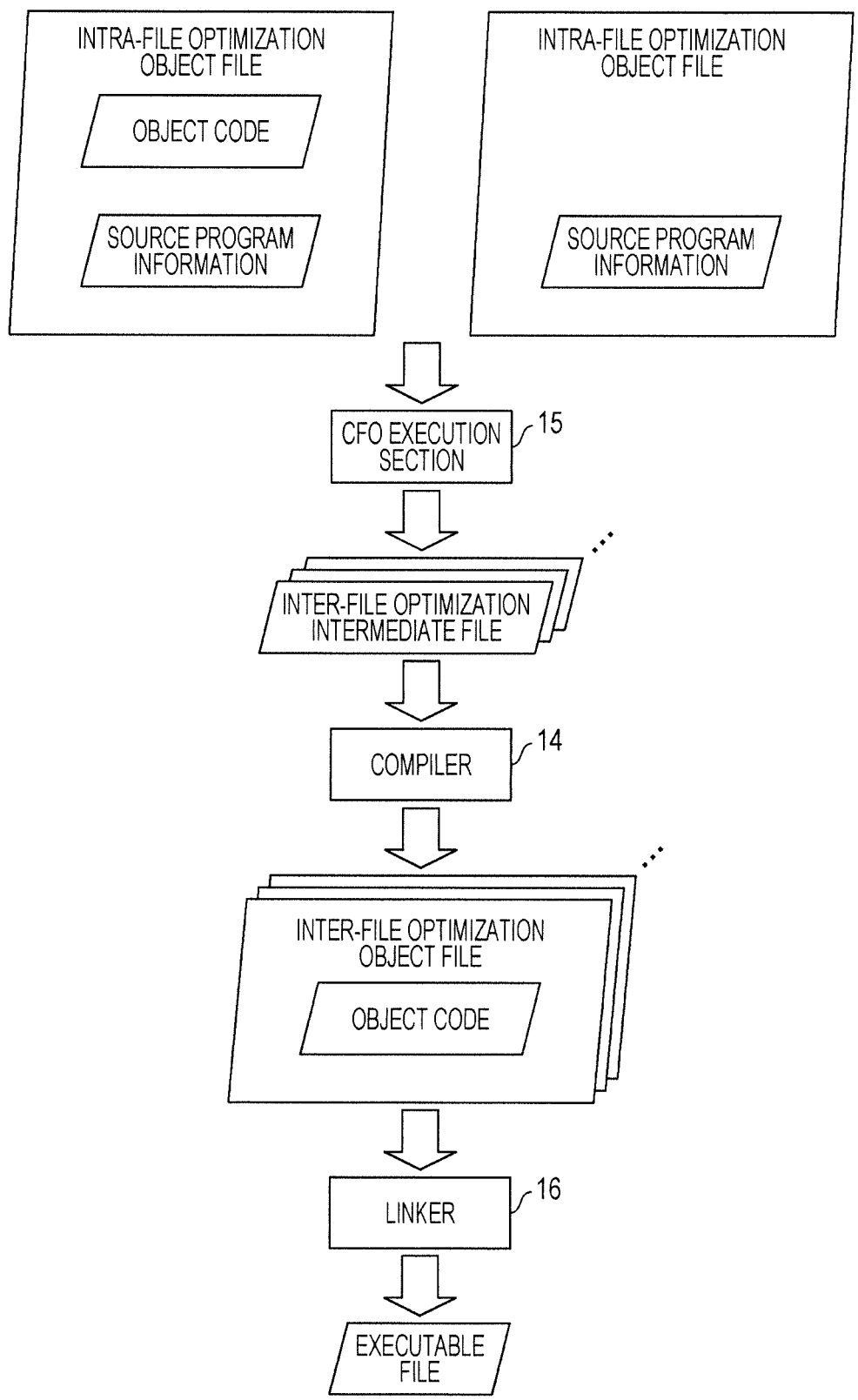
FIG. 4 is a diagram illustrating the overview of the operations of the information processor in the first embodiment.

An overview of operations of the information processor 1 in the first embodiment is described using FIGS. 2 to 4.

Pre-processing to be performed before compilation is described using FIG. 2. In this embodiment, the LTO object extraction section 10 analyzes a makefile command sequence including an execution result of the make command ("make -n", for example) to extract an object file including an object code that is not linked. A source file name corresponding to that object file is stored in the data storage section 13.

Compilation is described using FIG. 3. In the first embodiment, an object code is not generated for all source files. More specifically, compilation before inter-file optimization is performed (that is to say first-path compilation) is omitted for any source file corresponding to an object file including an object code that is not linked. Therefore, as a result of processing by the compiler 14, an intra-file optimization object file including an object code and an intra-file optimization object file that does not include an object code are generated. Note that an intra-file optimization object file is an object file to be generated by performing optimization of only a single file.

Linking is described using FIG. 4. Linking in the first embodiment is same as general linking. More specifically, inter-file optimization is performed on an intra-file optimization object file to generate an inter-file optimization intermediate file, and an inter-file optimization object file including an object code is generated from the inter-file optimization intermediate file. Then, the linker 16 generates an executable file by linking the inter-file optimization object file.

The operations of the information processor 1 in the first embodiment are described in more detail using FIGS. 5 to 19.

First, pre-processing is described using FIGS. 5 to 12. Based on makefile data stored in the execution rule storage section 12, the input tool 17 of the information processor 1 performs a dry run of the make command specified on a command line to generate a makefile command sequence (FIG. 5: Step S1).

FIG. 6 illustrates an example of data to be stored in an execution rule storage section 12. In the example of FIG. 6, it is described that "x.exe" is generated from "a.o" and "b.o", "y.exe" is generated from "a.o" and "c.o", "z.exe" is generated from "a.o" and "d.o", and "w.exe" is generated from "d.o" and "e.o". It is also stated that "a.o" is generated from "a.c", "b.o" is generated from "b.c", "c.o" is generated from "c.c", "d.o" is generated from "d.c", and "e.o" is generated from "e.c". Note that makefile is a file describing an execution rule of the make command.

Normally, a compile command and a link command are assigned a same name since the compile command and the link command are both implemented as the compiler driver 11. In the example of FIG. 6, "fcc" is used as a command for compilation or linking. In the command "fcc", the command "fcc" is a compile command when an extension of an input file is a predetermined extension (more specifically, an extension that is defined in advance in language specifications) and an option "-c" is appended. In the command "fcc", the command "fcc" is a link command if the extension of the input file is ".o" and the option "-c" is not appended. In addition, an output file name is specified after an option "-o".

An option to instruct link time optimization is "-Klto". Link time optimization is performed when the option "-Klto" is appended to both a compile command and a link command. In the example of FIG. 6, since the link time optimization option is appended to a command to generate "a.o" from "a.c", a command to generate "b.o" from "b.c", and a command to generate "x.exe" from "a.o" and "b.o", link time optimization is performed. Then, an executable file is generated by performing compilation and linking on an inter-file optimization intermediate file that results from the link time optimization.

Note that while it depends on addition of the option to a compile command and a link command in makefile whether or not link time optimization is performed, it is unknown to the compiler 14 till a command at the time of linking is specified.

In the example of FIG. 6, while "a.o" is generated in "fcc a.c -o a.o -c -Klto", "b.o" is generated in "fcc b.c -o b.o -c -Klto", and "c.o" is generated in "fcc c.c -o c.o -c -Klto", these are not linked in the link command. This is because the option "-Klto" is appended in "fcc a.o b.o -o x.exe -Klto" and link time optimization is performed on "a.c" and "b.c", and thus compilation and linking are performed on an inter-file optimization intermediate file generated through the link time optimization. Similarly, this is because the option "-Klto" is appended in "fcc a.o c.o -o y.exe -Klto" and link time optimization is performed on "a.c" and "c.c", and thus compilation and linking are performed on an inter-file optimization intermediate file generated through the link time optimization. Similarly, this is because the option "-Klto" is appended in "fcc a.o d.o -o z.exe -Klto" and link time optimization is performed on "a.c", and thus compilation and linking are performed on an inter-file optimization intermediate file generated through the link time optimization. In addition, "d.o" that is generated with the option "-Klto" not appended to the compile command is linked.

FIG. 7 illustrates an example of a makefile command to be generated. The example of FIG. 7 illustrates a result of execution of the command "make -n" based on the makefile illustrated in FIG. 6.

Figure 5:
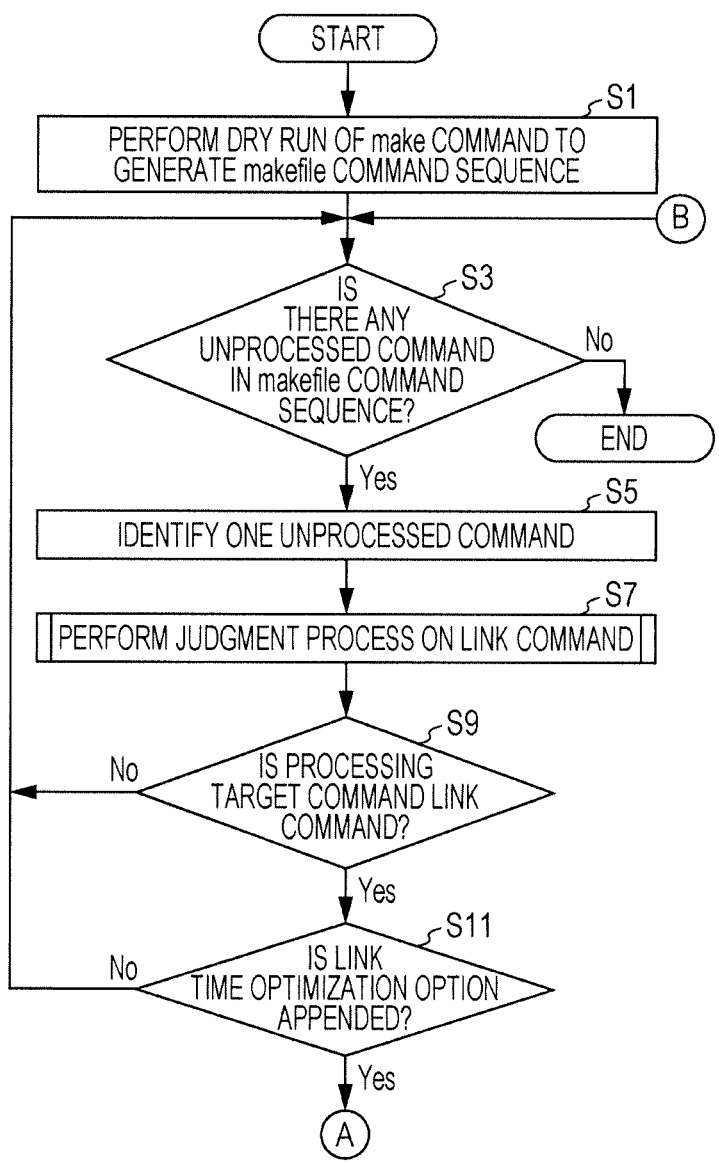
FIG. 5 is a diagram illustrating a processing flow of pre-processing in the first embodiment.

Turing back to the description in FIG. 5, the LTO object extraction section 10 judges whether there is any unprocessed command in the makefile command sequence generated in step S1 (step S3).

When there is no unprocessed command (step S3: NO), processing ends. On the other hand, when there is an unprocessed command (step S3: YES), the LTO object extraction section 10 identifies one unprocessed command (hereinafter referred to as a processing target command) from the makefile command sequence (step S5).

The LTO object extraction section 10 performs a judgment process on a link command (step S7). The judgment process on the link command is described using FIG. 8.

Figure 8:
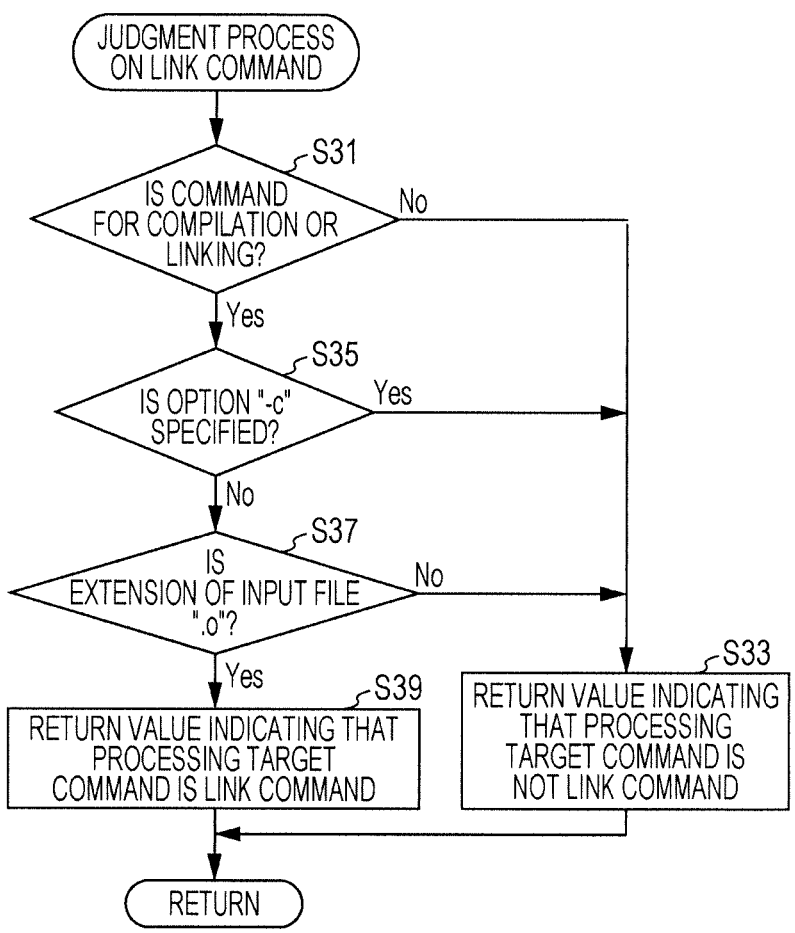
FIG. 8 is a diagram illustrating a processing flow of a judgment process on a link command.

First, the LTO object extraction section 10 judges whether a processing target command is a command for compilation or linking (more specifically, "fcc") (FIG. 8: step S31).

If the processing target command is not the command for compilation or linking (step S31: NO), the LTO object extraction section 10 returns a value indicating that the processing target command is not the link command, as a return value (step S33). Then, processing returns to an invoking source.

On the other hand, if the processing target command is the command for compilation or linking (step S31: YES), the LTO object extraction section 10 judges whether an option "-c" is appended to the processing target command (step S35).

If the option "-c" is appended to the processing target command (step S35: YES), the processing target command is a compile command, and thus processing proceeds to step S33.

On the other hand, if the option "-c" is not appended to the processing target command (step S35: NO), the LTO object extraction section 10 judges whether an extension of an input file of the processing target command is ".o" (step S37).

If the extension of the input file of the processing target command is not ".o" (step S37: NO), processing proceeds to step S33.

On the other hand, if the extension of the input file of the processing target command is ".o" (step S37: YES), the LTO object extraction section 10 returns a value indicating that the processing target command is a link command, as a return value (step S39). Then, processing returns to the invoking source.

If the processing as described above is performed, it may be appropriately judged whether or not a processing target command is a link command.

Turning back to the description of FIG. 5, the LTO object extraction section 10 judges whether it is judged that the processing target command is a link command (step S9). If it is judged that the processing target command is not a link command (step S9: NO), processing returns to the processing of step S3.

On the other hand, if it is judged that the processing target command is a link command (step S9: YES), the LTO object extraction section 10 judges whether a link time optimization option is appended to the processing target command (step S11).

If the link time optimization option is not appended to the processing target command (step S11: NO), processing returns to step S3. On the other hand, if the link time optimization option is appended to the processing target command (step S11: YES), processing proceeds to step S13 in FIG. 9 by way of a terminal A.

Figure 9:
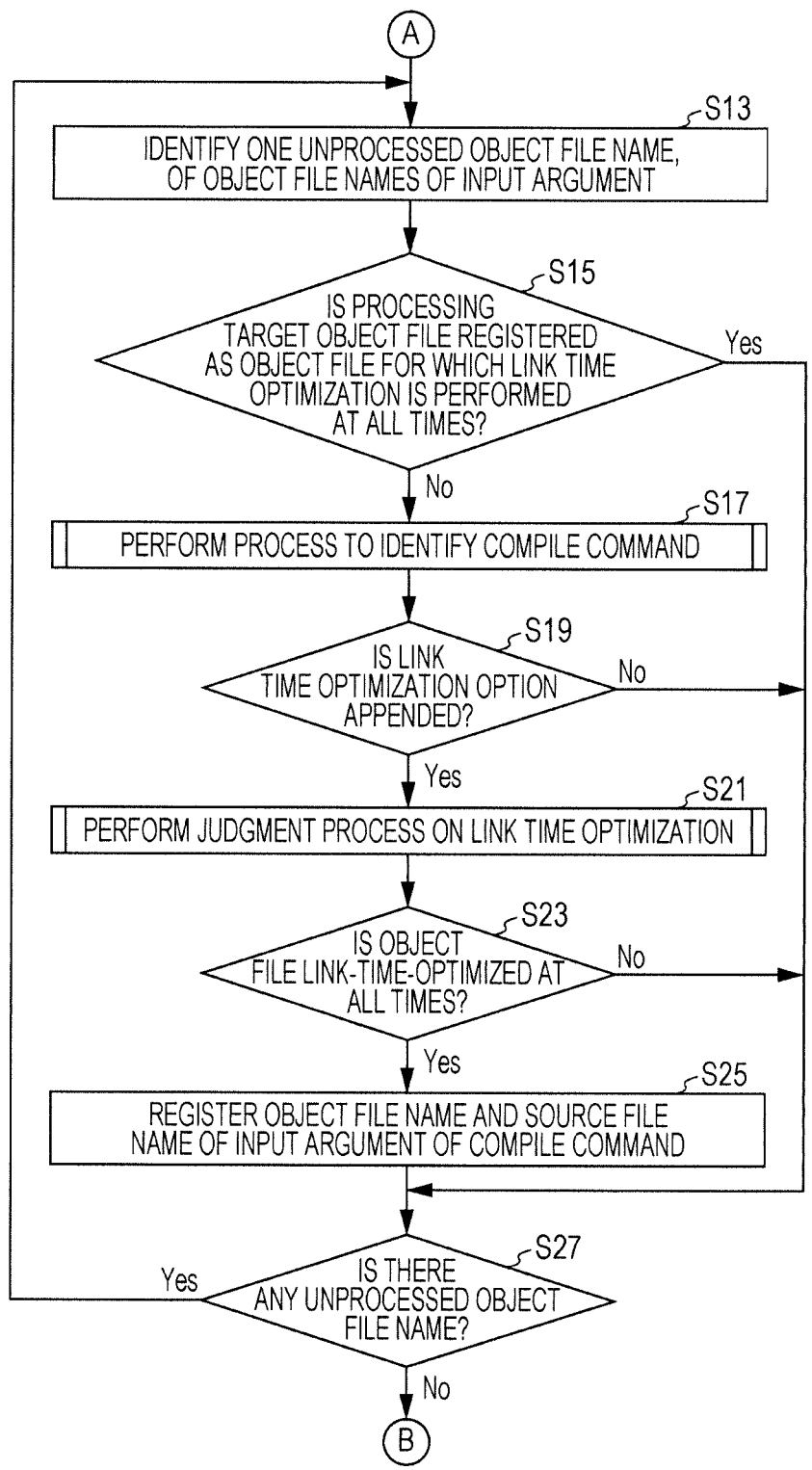
FIG. 9 is a diagram illustrating a processing flow of pre-processing in the first embodiment.

Proceeding to the description of FIG. 9, the LTO object extraction section 10 identifies one unprocessed object file name of object file names of input arguments of the processing target command (FIG. 9: step S13). In the following, an object file having the object file name identified in step S13 is referred to as a processing target object file.

The LTO object extraction section 10 judges whether the processing target object file is registered in the data storage section 13 as an object file on which link time optimization is performed at all times (step S15).

If the processing target object file is already registered in the data storage section 13 as the object file on which link time optimization is performed at all times (step S15: YES), processing proceeds to step S27 since the processing target object file does not have to be newly registered.

On the other hand, if the processing target object file is not registered in the data storage section 13 as the object file on which link time optimization is performed at all times (step S15: NO), the LTO object extraction section 10 performs a process to identify a compile command (step S17). The process to identify a compile command is described using FIG. 10.

Figure 10:
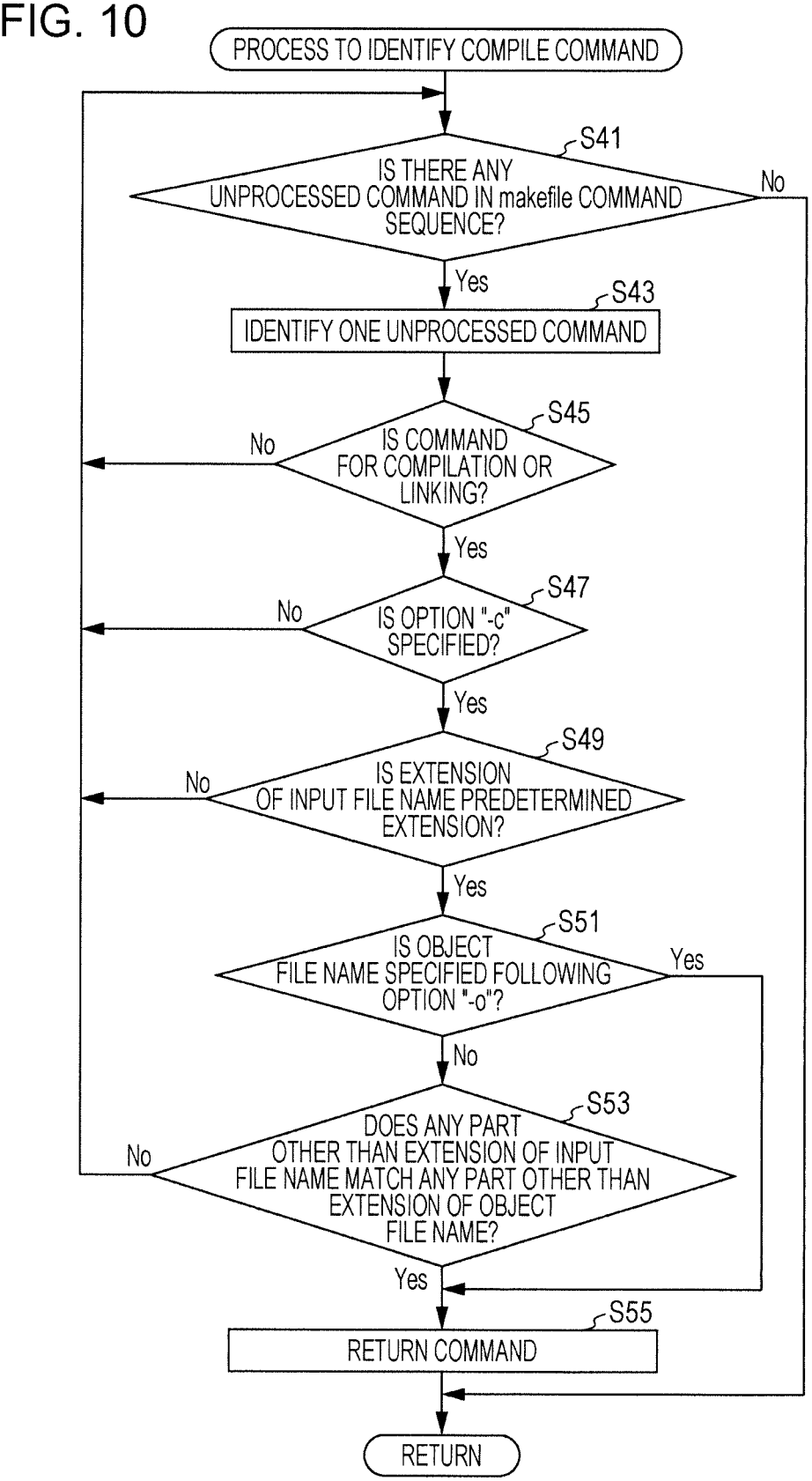
FIG. 10 is a diagram illustrating a processing flow of an identification process of a compile command.

First, the LTO object extraction section 10 judges whether there is an unprocessed command sequence in the makefile command sequence (FIG. 10: step S41). If there is no unprocessed command sequence (step S41: NO), processing returns to the invoking source.

On the other hand, if there is an unprocessed command sequence in the makefile command sequence (step S41: YES), the LTO object extraction section 10 identifies one unprocessed command (hereinafter referred to as a "processing target command" in the process to identify a compile command) from the makefile command sequence (step S43).

The LTO object extraction section 10 judges whether the processing target command is the command for compilation or linking (more specifically, "fcc") (step S45).

If the processing target command is not the command for compilation or linking (step S45: NO), processing returns to step S41.

On the other hand, if the processing target command is the command for compilation or linking (step S45: YES), the LTO object extraction section 10 judges whether an option "-c" is appended to the processing target command (step S47).

If the option "-c" is not appended to the processing target command (step S47: NO), processing returns to step S41 since the processing target command is not a compile command.

If the option "-c" is appended to the processing target command (step S47: YES), the following processing is performed. Specifically, the LTO object extraction section 10 judges whether an extension of an input file name of the processing target command is a predetermined extension (".c", for example) (step S49).

If the extension of the input file name of the processing target command is not the predetermined extension (step S49: NO), processing returns to step S41.

On the one hand, if the extension of the input file name of the processing target command is the predetermined extension (step S49: YES), the following processing is performed. Specifically, the LTO object extraction section 10 judges whether a processing target object file name is specified following an option "-o" in the processing target command (step S51).

If the processing target object file name is specified following the option "-o" in the processing target command (step S51: YES), processing proceeds to step S55 since the processing target command is the compile command.

On the other hand, if the processing target object file name is not specified following the option "-o" in the processing target command (step S51: NO), the following process is performed. Specifically, the LTO object extraction section 10 judges whether any part other than the extension of the input file name of the processing target command matches any part other than the extension of the processing target object file name (step S53).

If any part other than the extension of the input file name of the processing target command does not match any part other than the extension of the processing target object file name (step S53: NO), processing returns to step S41.

On the other hand, if any part other than the extension of the input file name of the processing target command matches any part other than the extension of the processing target object file name (step S53: YES), the LTO object extraction section 10 returns the processing target command as a return value (step S55). Then, processing returns to the invoking source.

If the processing as described above is performed, a compile command to output an object file having a processing target object file name may be identified.

Turning back to the description of FIG. 9, the LTO object extraction section 10 judges whether the link time optimization option is appended to the compile command identified in step S17 (step S19).

If the link time optimization option is not appended to the compile command identified in step S17 (step S19: NO), the link time optimization is not performed. Thus, processing proceeds to the step S27.

On the other hand, if the link time optimization option is appended to the compile command identified in step S17 (step S19: YES), the LTO object extraction section 10 performs a judgment process on link time optimization (step S21). The judgment process on link time optimization is described using FIG. 11.

Figure 11:
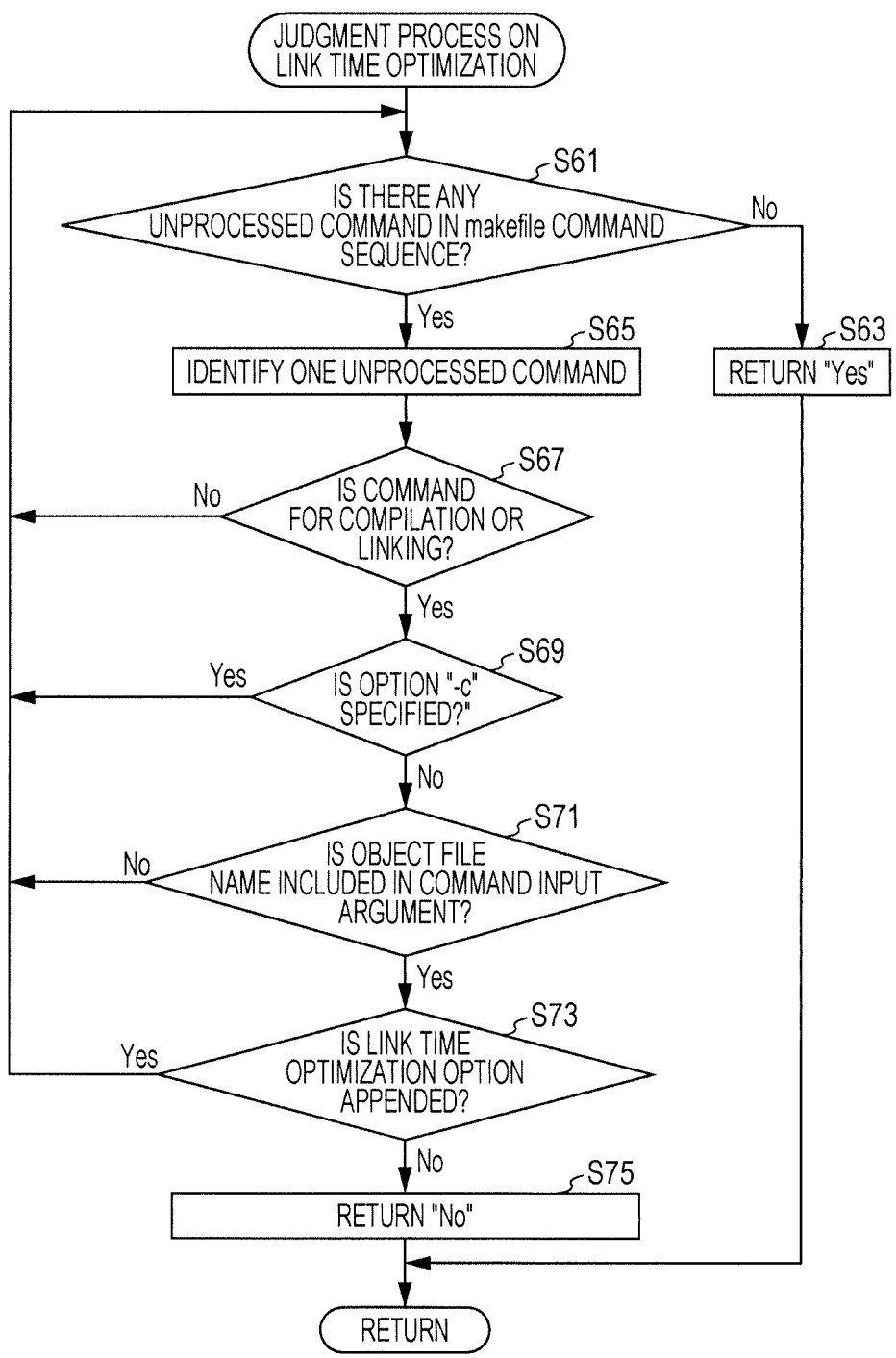
FIG. 11 is a diagram illustrating a judgment process on link time optimization.

First, the LTO object extraction section 10 judges whether there is any unprocessed command in the makefile command sequence (FIG. 11: step S61).

If there is no unprocessed command in the makefile command sequence (step S61: NO), the LTO object extraction section 10 returns "Yes" (that is to say, link time optimization is performed at all times) as a return value (step S63). Then, processing returns to the invoking source.

On the other hand, if there is an unprocessed command in the makefile command sequence (step S61: YES), the LTO object extraction section 10 identifies one unprocessed command (hereinafter referred to as a "processing target command" in the process to judge on link time optimization) from the makefile command sequence (step S65).

The LTO object extraction section 10 judges whether a processing target command is a command for compilation or linking (step S67).

If the processing target command is not the command for compilation or linking (step S67: NO), processing returns to step S61.

On the other hand, if the processing target command is the command for compilation or linking (step S67: YES), the LTO object extraction section 10 judges whether an option "-c" is appended to the processing target command (step S69).

If the option "-c" is appended to the processing target command (step S69: YES), the processing target command is a compile command, and thus processing returns to step S61.

On the other hand, if the option "-c" is not appended to the processing target command (step S69: NO), the following processing is performed. Specifically, the LTO object extraction section 10 judges whether an input argument of the processing target command (that is to say, the link command) includes a processing target object file name (step S71).

If the input argument of the processing target command does not include the object file name (step S71: NO), processing returns to step S61.

On the other hand, if the input argument of the processing target command includes the processing target object file name (step S71: YES), the following processing is performed. Specifically, the LTO object extraction section 10 judges whether a link time optimization option is appended to the processing target command (step S73).

If the link time optimization option is appended to the processing target command (step S73: YES), processing returns to step S61.

On the other hand, if the link time optimization option is not appended to the processing target command (step S73: NO), the LTO object extraction section 10 returns "No" (that is to say, link time optimization is not performed at all times) as a return value (step S75). Then, processing returns to the invoking source.

If the processing as described above is performed, it may be judged whether a processing target object file is link-time-optimized at all times.

Returning to the description of FIG. 9, based on a result of the processing of step S21, the LTO object extraction section 10 judges whether the processing target object file is link-time-optimized at all times (step S23).

If the processing target object file is not optimized at all times (step S23: NO), processing proceeds to step S27.

On the other hand, if the processing target object file is optimized at all times (step S23: YES), the LTO object extraction section 10 performs the following processing. Specifically, the LTO object extraction section 10 registers in the data storage section 13 the object file name identified in step S13, as an object file that is link-time-optimized at all times. The LTO object extraction section 10 also registers in the data storage section 13 a source file name of an input argument of the compile command identified in step S17 as a source file not desirable to be compiled (more specifically, the first-path compilation) (step S25).

FIG. 12 illustrates an example of data to be stored in the data storage section 13. In the example of FIG. 12, an object file name on which link time optimization is performed and a name of a source file not desirable to be compiled are stored.

The LTO object extraction section 10 judges whether there is any unprocessed object file name (step S27). If there is any unprocessed object file name (step S27: YES), processing returns to step S13 to process a next object file name. On the other hand, if there is no unprocessed object file name (step S27: NO), processing returns to step S3 in FIG. 5 by way of a terminal B.

If the processing as described above is performed, a source file not desirable to be compiled may be identified.

Next, processing during compilation is described using FIGS. 13 to 16.

First, processing to be performed by the compilation judgment section 110 is described using FIGS. 13 and 14. The compilation judgment section 110 judges whether data is stored in the data storage section 13 (FIG. 13: step S81).

If no data is stored in the data storage section 13 (step S81: NO), processing ends.

If data is stored in the data storage section 13 (step S81: YES), the compilation judgment section 110 reads one unprocessed record from the data storage section 13. Then, the compilation judgment section 110 identifies a source file not desirable to be compiled that is included in the read record (step S83).

The compilation judgment section 110 judges whether the source file identified in step S83 matches a source file specified on a command line (input from an operator is accepted, for example) (step S85).

If the source file identified in step S83 does not match the source file specified on the command line (step S85: NO), processing proceeds to step S89.

On the other hand, if the source file identified in step S83 matches the source file specified on the command line (step S85: YES), the following processing is performed. Specifically, the compilation judgment section 110 sets in the memory an omission flag (here "1") indicating that the first-path compilation is omitted (step S87).

FIG. 14 illustrates an example of an omission flag to be set in the memory. In the example of FIG. 14, a source file name and an omission flag indicating that the first-path compilation is omitted are stored.

The compilation judgment section 110 judges whether there is any unprocessed record in the data storage section 13 (step S89). If there is an unprocessed record (step S89: YES), processing returns to step S83.

On the other hand, if there is no unprocessed record (step S89: NO), processing ends.

Figure 15:
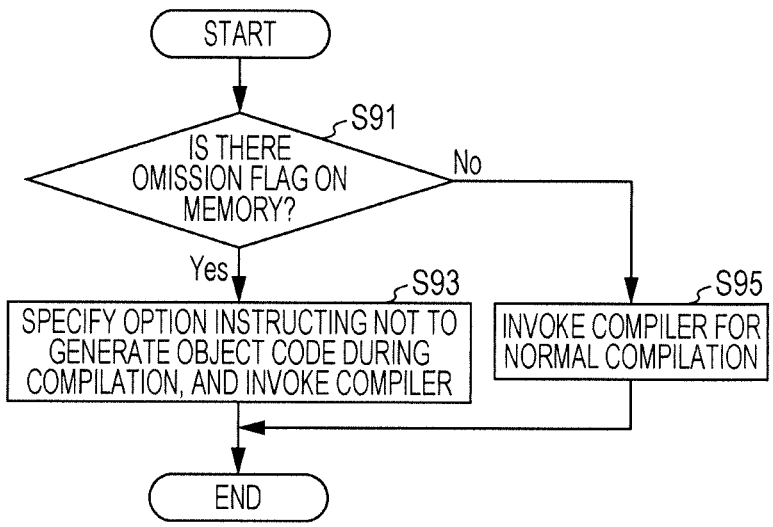
FIG. 15 is a diagram illustrating a processing flow of a process to be performed by a compilation control section.

Processing to be performed by the compilation control section 111 is described using FIG. 15. The compilation control section 111 judges for each of source files specified on a command line whether an omission flag is set on the memory (FIG. 15: step S91).

The compilation control section 111 performs the following processing on a source file for which an omission flag is set on the memory, of the source files specified on the command line. Specifically, the compilation control section 111 appends an option instructing to omit the first-path compilation and invokes the compiler 14 (step S93). Then, processing ends.

The compilation control section 111 performs the following processing on a source file for which no omission flag is set on the memory, of the source files specified on the command line. Specifically, the compilation control section 111 invokes the compiler 14 for normal compilation (step S95). Then, processing ends.

Figure 16:
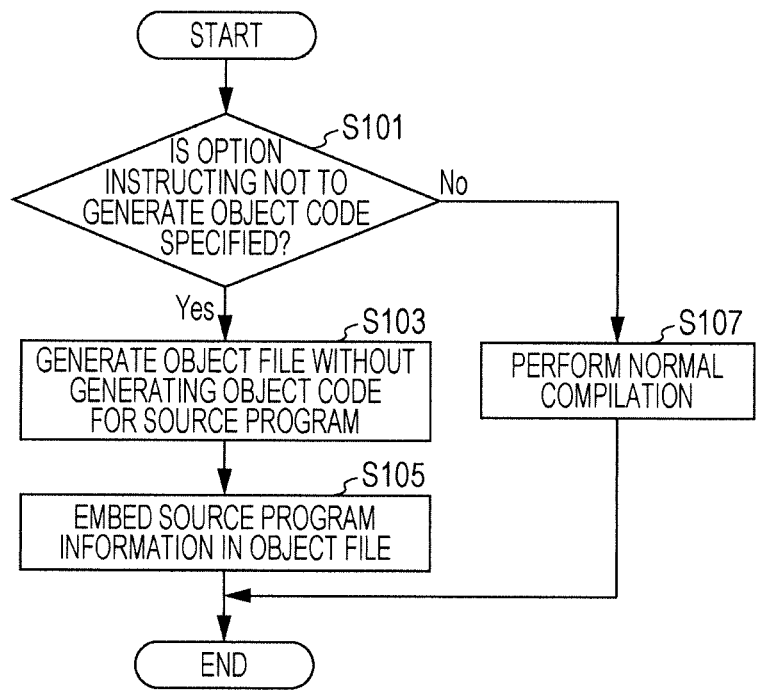
FIG. 16 is a diagram illustrating a processing flow of a process to be performed by a compilation omission section.

Processing to be performed by the compilation omission section 141 of the compiler 14 is described using FIG. 16. When invoked by the compilation control section 111, the compilation omission section 141 judges whether an option instructing not to generate an object code is appended to an invoking command (FIG. 16: step S101).

If the option instructing not to generate an object code is not appended (step S101: NO), when invoked, the compiler 14 performs normal compilation on a source file specified by the compilation control section 111 (step S107). Then, processing ends.

On the other hand, if the option instructing not to generate an object code is appended (step S101: YES), the following processing is performed. Specifically, when invoked, the compilation omission section 141 generates an object file without generating an object code for the source file specified by the compilation control section 111 (step S103).

The compilation omission section 141 embeds source program information in the object file generated in step S103 (step S105). Then, processing ends.

If the processing as described above is performed, generation of an object code may be omitted, which shortens processing time of the compiler 14 and thus allows time taken to generate an executable file to be shortened.

Figures 17, 18:
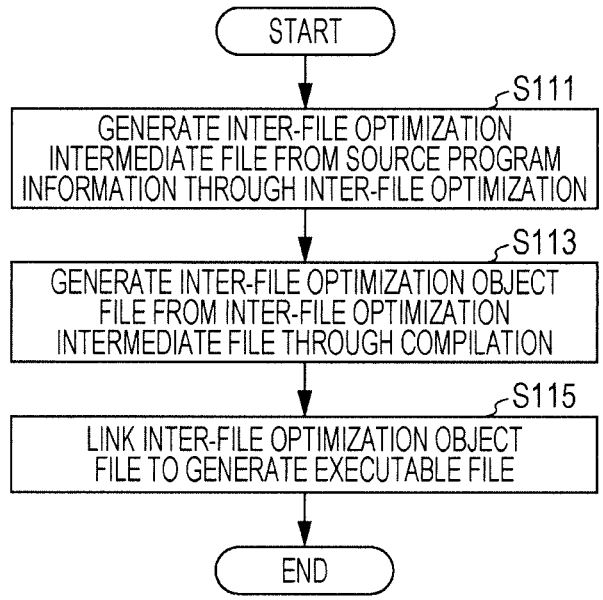
FIG. 17 is a diagram illustrating a processing flow of a process during linking in the first embodiment.
FIG. 18 is a diagram illustrating compilation omission in the first embodiment.

Next, processing during linking is described using FIG. 17. First, the CFO execution section 15 generates an inter-file optimization intermediate file from source program information of each object file specified on a command line (FIG. 17: step S111).

The compiler 14 generates an inter-file optimization object file from each inter-file optimization intermediate file generated in step S111 (step S113). Processing of step S113 is normal compilation.

The linker 16 generates an executable file by linking the inter-file optimization object files generated in step S113 (step S115). Then, processing ends.

If the processing as described above is performed, an executable file may be generated even if generation of an object code (more specifically, the first-path compilation) during compilation is omitted for at least some source files.

Omission of compilation according to the first embodiment is specifically described using FIGS. 18 and 19.

Now, a command sequence including the commands illustrated in (1) to (9) in FIG. 18 is taken as an example. Then, FIG. 19 illustrates a comparison of source files for which an object code is generated when each command illustrated in FIG. 18 is executed.

As for "x.exe", in the case of normal compilation and linking, an object code is generated for an inter-file optimization intermediate program corresponding to "a.c", "b.c", and "a.c" and an inter-file optimization intermediate program corresponding to "b.c". On the other hand, according to the first embodiment, an object code is generated for an inter-file optimization intermediate program corresponding to "a.c" and an inter-file optimization intermediate program corresponding to "b.c". Therefore, the number is decreased from 4 to 2.

As for "y.exe", in the case of normal compilation and linking, an object code is generated for an inter-file optimization intermediate program corresponding to "a.c", "c.c", and "a.c" and an inter-file optimization intermediate program corresponding to "c.c". On the other hand, according to the first embodiment, an object code is generated for an inter-file optimization intermediate program corresponding to "a.c" and an inter-file optimization intermediate program corresponding to "c.c". Therefore, the number is decreased from 4 to 2.

As for "z.exe", in the case of normal compilation and linking, an object code is generated for an inter-file optimization intermediate program corresponding to "a.c", "d.c", and "a.c". On the other hand, according to the first embodiment, an object code is generated for an inter-file optimization intermediate program corresponding to "d.c" and "a.c". Therefore, the number is decreased from 3 to 2.

As for "w.exe", in the case of normal compilation and linking, an object code is generated for "d.c" and "e.c". On the other hand, according to the first embodiment, an object code is generated for "d.c" and "e.c". Therefore, the numbers of both cases remain unchanged.

Now, for a case in which the data illustrated in FIG. 6 is stored in the data storage section 13, the operations of the first embodiment are described more specifically.

First, a makefile command sequence is generated through a dry run. If a compile or link command "fcc" is detected, an option "-c" is not appended, and an extension of an input file is ".o", the command is a link command. Processing in the following is performed on that link command.

First, it is confirmed through a character-string comparison of the command and "-Klto" that the option "-Klto" is appended to the link command "fcc a.o b.o -o x.exe -Klto".

Of object files "a.o" and "b.o" of input arguments of the link command, "a.o" is not registered in the data storage section 13 as an object file on which link time optimization is performed at all times. "fcc a.c -o a.o -c -Klto" is detected as a compile command to which the option "-c" is appended, for which an extension of an input file is defined according to language specifications, and "a.o" is specified following an option "-o" as an output file, or only the extension of the input file and an extension of an output file are different. Now, it is confirmed through a character-string comparison of the command and "-Klto" that an option "-Klto" is appended to the compile command. Then, it is judged as described below that "a.o" is link-time-optimized at all times and linked. Specifically, in the makefile command sequence, "fcc a.o b.o -o x.exe -Klto" and "fcc a.o c.o -o y.exe -Klto", and "fcc a.o d.o -o z.exe -Klto" are present as a command that includes "a.o" in input. Then, it is confirmed through a character-string comparison of the command and "-Klto" that the option "-Klto" is appended to the command "fcc" for which "a.o" is input. With this, it is judged that "a.o" is optimized during linking at all times. Accordingly, a new record is created in the data storage section 13 and "a.o" is registered as an object file that is optimized during linking at all times. In addition, the input argument "a.c" of the compile command for which "a.o" is specified as an output file is registered as a source file not desirable to be compiled.

In addition, of the object files "a.o" and "b.o" of the input arguments of the link command, "b.o" is also not registered in the data storage section 13 as an object file on which link time optimization is performed at all times. "fcc b.c -o b.o -c -Klto" is detected as a compile command to which the option "-c" is appended, for which the extension of the input file is defined according to the language specifications, and "b.o" is specified following the option "-o" as an output file, or only the extension of the input file and the extension of an output file are different. Now, it is confirmed through a character-string comparison of the command and "-Klto" that the option "-Klto" is appended to the compile command. In addition, "fcc a.o b.o -o x.exe -Klto" is detected as the link command for which the input file is "b.o". It is confirmed through a character-string comparison of the command and "-Klto" that the option "-Klto" is appended and link time optimization is performed. Accordingly, a new record is created in the data storage section 13 and "b.o" is registered as an object file that is optimized during linking at all times. In addition, "b.c" of the input argument of the compile command for which "b.o" is specified as an output file is registered as a source file not desirable to be compiled.

Next, it is confirmed through a character-string comparison of the command and "-Klto" that the option "-Klto" is appended to the link command "fcc a.o c.o -o y.exe -Klto".

Of the object files "a.o" and "c.o" of the input arguments of the link command, "a.o" is already registered in the data storage section 13 as an object file on which link time optimization is performed at all times. On the other hand, "c.o" is not registered in the data storage section 13 as an object file on which link time optimization is performed at all times. For "c.o", "fcc c.c -o c.o -c -Klto" is detected as a compile command to which the option "-c" is appended, for which the extension of the input file is defined according to the language specifications, and "c.o" is specified following the option "-o" as the output file, or only the extension of the input file and the extension of the output file are different. It is confirmed through a character-string comparison of the command and "-Klto" that the option "-Klto" is appended to the compile command. "fcc a.o c.o -o y.exe -Klto" is detected as a link command for which "c.o" is an input file, and it is confirmed through a character-string comparison of the command and "-Klto" that the option "-Klto" is appended and optimization is performed during linking. Accordingly, a new record is created in the data storage section 13 and "c.o" is registered as an object file that is optimized during linking at all times. In addition, the input argument "c.c" of the compile command for which "c.o" is specified as an output file following the option "-o" is registered as a source file not desirable to be compiled.

Next, it is confirmed through a character-string comparison of the command and "-Klto" that the option "-Klto" is appended to the link command "fcc a.o d.o -o z.exe -Klto".

Of the object files "a.o" and "d.o" of the input arguments of the link command, "a.o" is already registered in the data storage section 13 as an object file on which link time optimization is performed at all times. On the other hand, "d.o" is not registered in the data storage section 13 as an object file on which link time optimization is performed at all times. For "d.o", "fcc d.c -o d.o -c" is detected as a compile command to which the option "-c" is appended, for which the extension of the input file is defined according to the language specifications, and "d.o" is specified following the option "-o" as an output file, or only the extension of the input file and the extension of the output file are different. However, the option "-Klto" is not appended to the compile command. Therefore, a record is not created in the data storage section 13 for the object file of the input argument of this link command.

Lastly, for the link command "fcc d.o e.o -o w.exe", it is confirmed through a character-string comparison of the command and "-Klto" that the option "-Klto" is not appended. Therefore, no processing is performed on this link command.

As described above, records are accumulated in the data storage section 13.

Then, processing during compilation and processing during linking are described.

During compilation, if a source file name specified on a command line is registered in the data storage section 13 as a source file not desirable to be compiled, an omission flag is set on the memory. For example, when "a.c" is compiled, an omission flag is set on "a.c" as a source file not desirable to be compiled. When "d.c" is compiled, no omission flag is set. During compilation, compilation of a source file for which an omission flag is set on the memory is omitted. For example, if a source file not desirable to be compiled is "a.c", no object code is generated for "a.c" and source program information corresponding to "a.c" is embedded in the object file "a.o".

During linking, source program information is retrieved from an object file, compilation and linking are performed after inter-file optimization is performed, and then an executable file is generated.

In the first embodiment, generation of an object code is omitted on the assumption that inter-file optimization is performed during linking.

In a second embodiment to be described below, generation of an object code is omitted while inter-file optimization is performed during compilation.

Figure 20:
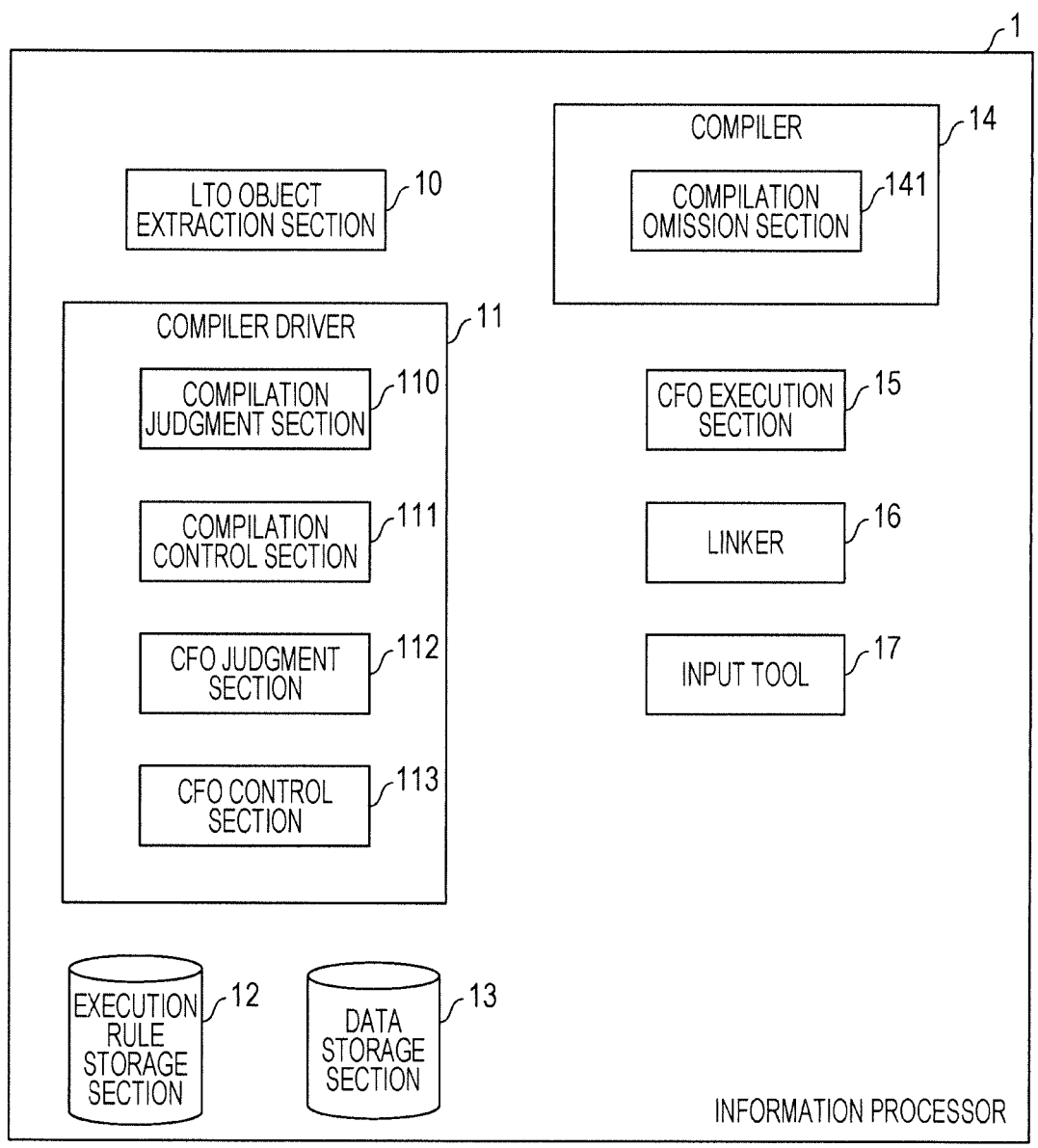
FIG. 20 is a functional block diagram of an information processor in a second embodiment.

FIG. 20 illustrates a functional block diagram of an information processor 1 in the second embodiment. The information processor 1 includes an LTO object extraction section 10, a compiler driver 11, an execution rule storage section 12, a data storage section 13, a compiler 14, a CFO execution section 15, a linker 16, and an input tool 17. The compiler driver 11 includes a compilation judgment section 110, a compilation control section 111, a CFO judgment section 112, and a CFO control section 113. The compiler 14 includes a compilation omission section 141.

Any elements other than the CFO judgment section 112 and the CFO control section 113 are as described in the first embodiment. The CFO judgment section 112 performs a process to judge if to perform inter-file optimization when an object file is linked. The CFO control section 113 controls execution of inter-file optimization according to a judgment result of the CFO judgment section 112.

Figure 21:
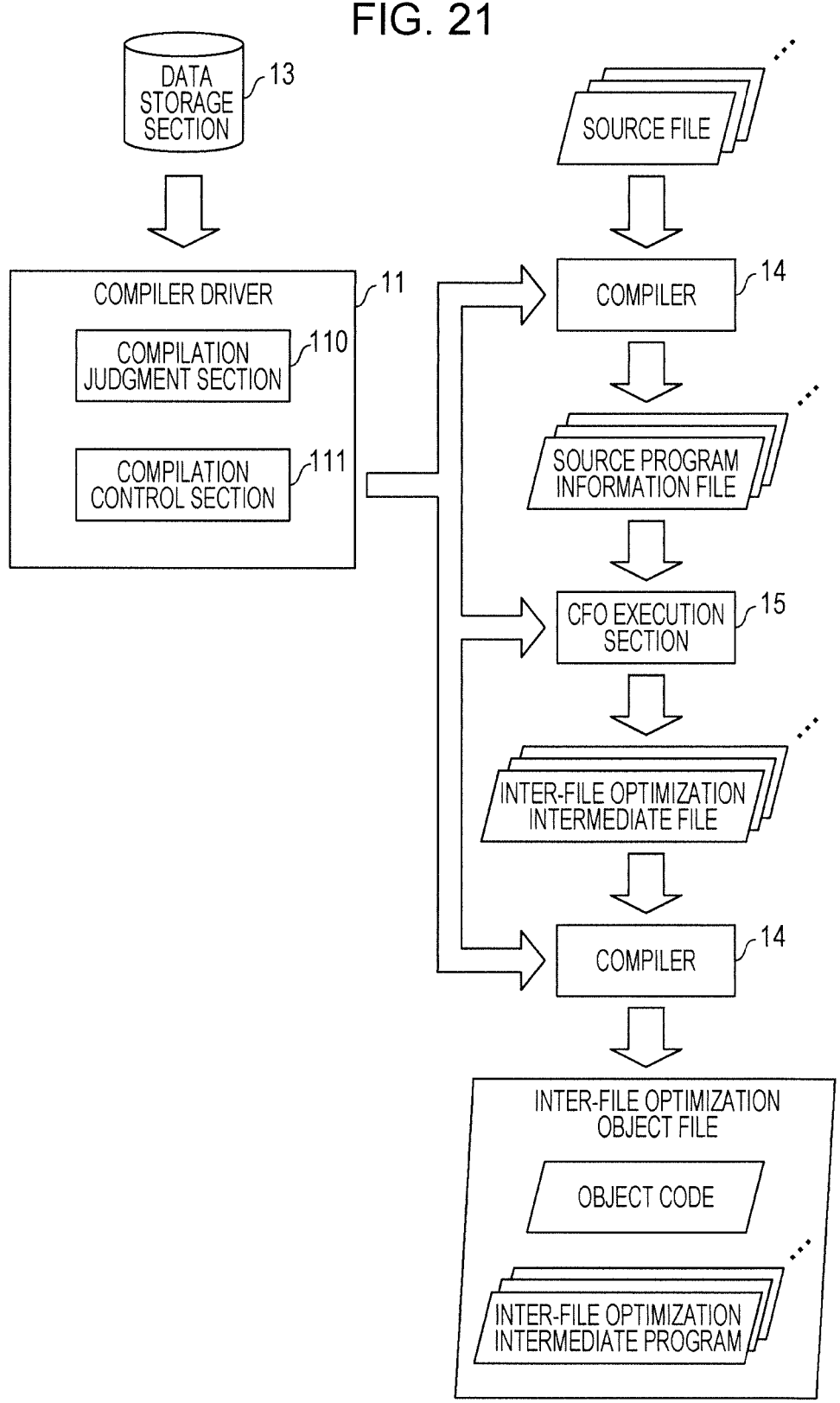
FIG. 21 is a diagram illustrating an overview of operations of the information processor in the second embodiment.
Figure 22:
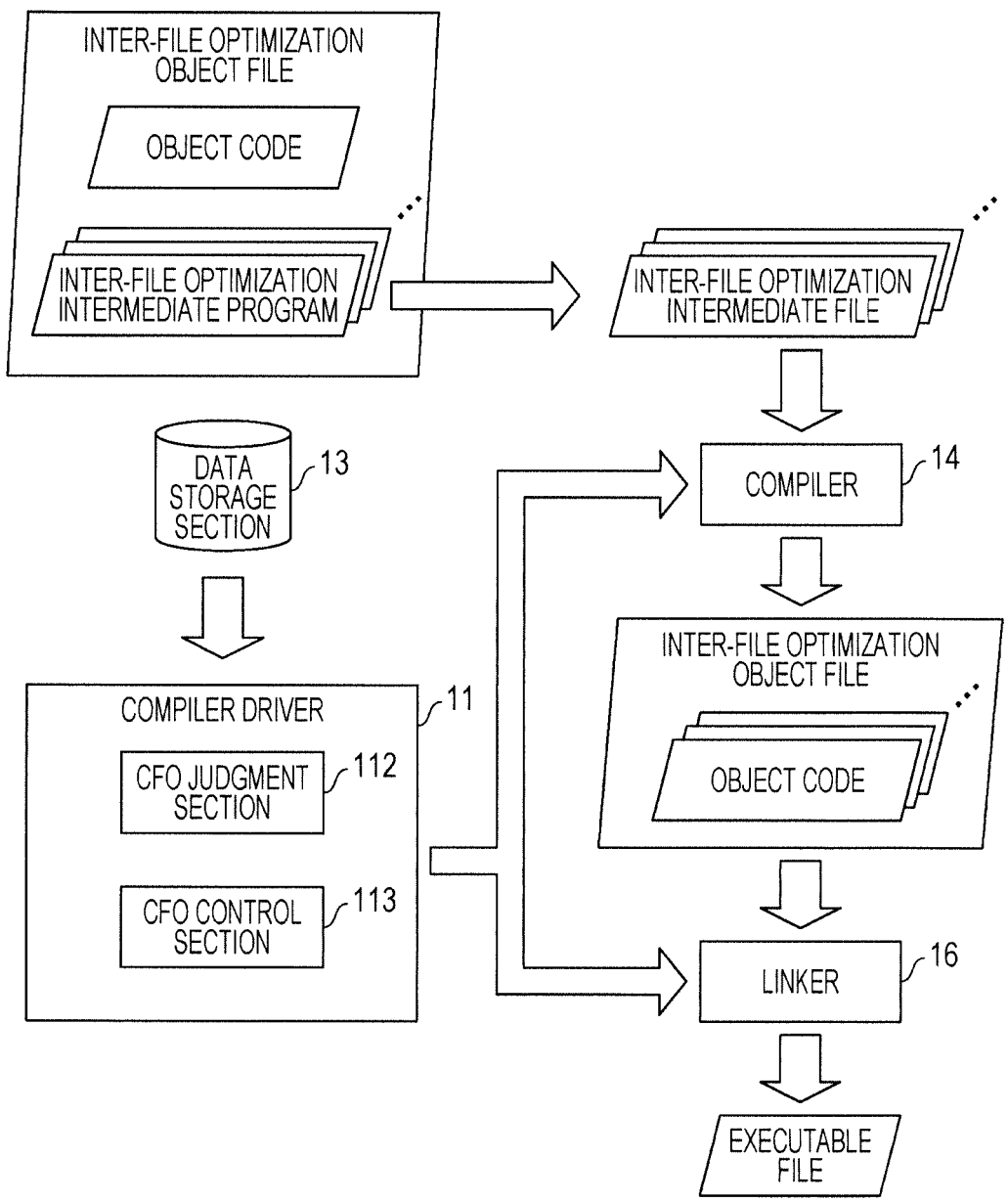
FIG. 22 is a diagram illustrating the overview of operations of the information processor in the second embodiment.

An overview of operations of the information processor 1 of the second embodiment is described using FIGS. 21 and 22.

Compilation is described using FIG. 21. In the second embodiment, an inter-file optimization intermediate file is generated for some source files during compilation. Furthermore, an inter-file optimization object file is generated through compilation of the inter-file optimization intermediate file. A source file, for which an inter-file optimization object file is generated during compilation, is not compiled during linking. In contrast to this, for a source file for which no inter-file optimization object file is generated during compilation, an inter-file optimization intermediate program is generated through inter-file optimization and an object code is also generated through compilation.

Linking is described using FIG. 22. In the second embodiment, compilation is performed on an inter-file optimization intermediate file of a source file for which an inter-file optimization object file is not generated during compilation. Then, the linker 16 links the inter-file optimization object file resulting from execution of compilation and the inter-file optimization object file generated during compilation, thereby generating an executable file.

The operations of the information processor 1 in the second embodiment are described in more detail using FIGS. 23 to 34.

Figure 23:
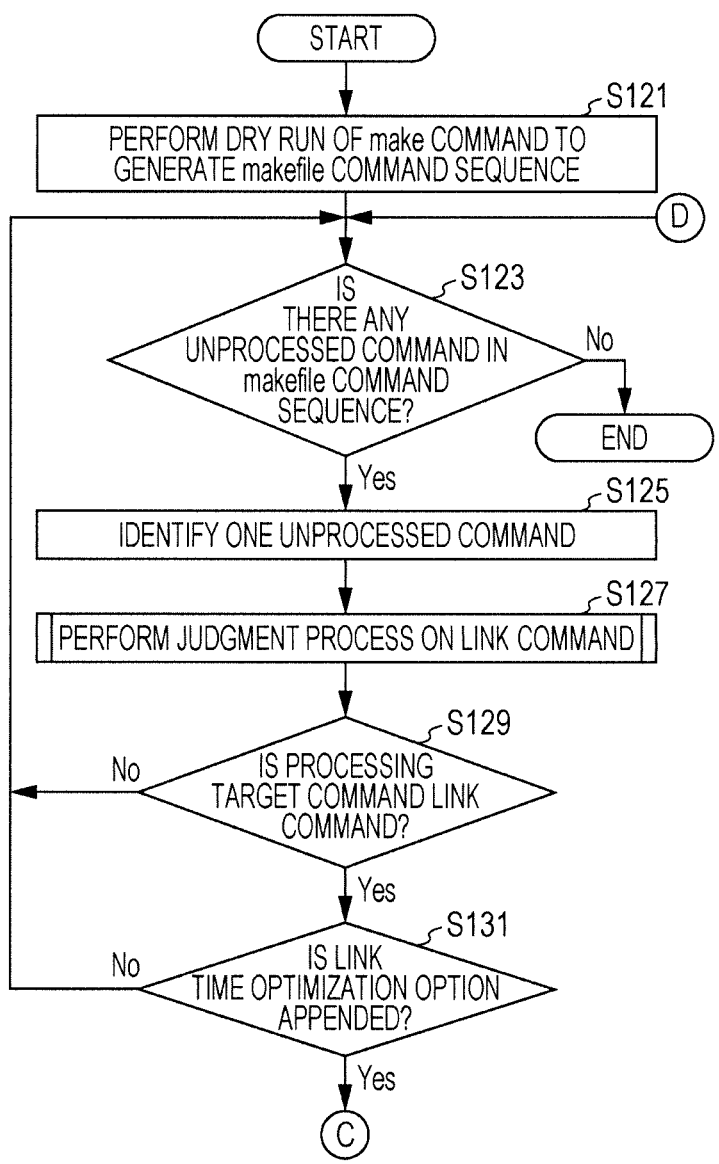
FIG. 23 is a diagram illustrating a processing flow of pre-processing in the second embodiment.

First, pre-processing is described using FIGS. 23 to 26. Based on data of makefile stored in the execution rule storage section 12, the input tool 17 of the information processor 1 performs a dry run of a make command specified on a command line to generate a makefile command sequence (FIG. 23: step S121).

The LTO object extraction section 10 judges whether there is any unprocessed command in the makefile command sequence generated in step S121 (step S123).

If there is no unprocessed command (step S123: NO), processing ends. On the other hand, if there is an unprocessed command (step S123: YES), the LTO object extraction section 10 identifies one unprocessed command (hereinafter referred to as a processing target command) from the makefile command sequence (step S125).

The LTO object extraction section 10 performs a judgment process on a link command (step S127). Since the judgment process on a link command is as described using FIG. 8, a description is omitted here.

The LTO object extraction section 10 judges whether it is judged that a processing target command is a link command (step S129). If it is judged that the processing target command is not a link command (step S129: NO), processing returns to step S123.

On the other hand, if it is judged that the processing target command is a link command (step S129: YES), the LTO object extraction section 10 judges whether a link time optimization option is appended to the processing target command (step S131).

If the link time optimization option is not appended to the processing target command (step S131: NO), processing returns to step S123. On the other hand, if the link time optimization option is appended to the processing target command (step S131: YES), processing proceeds to step S133 in FIG. 24 by way of a terminal C.

Figure 24:
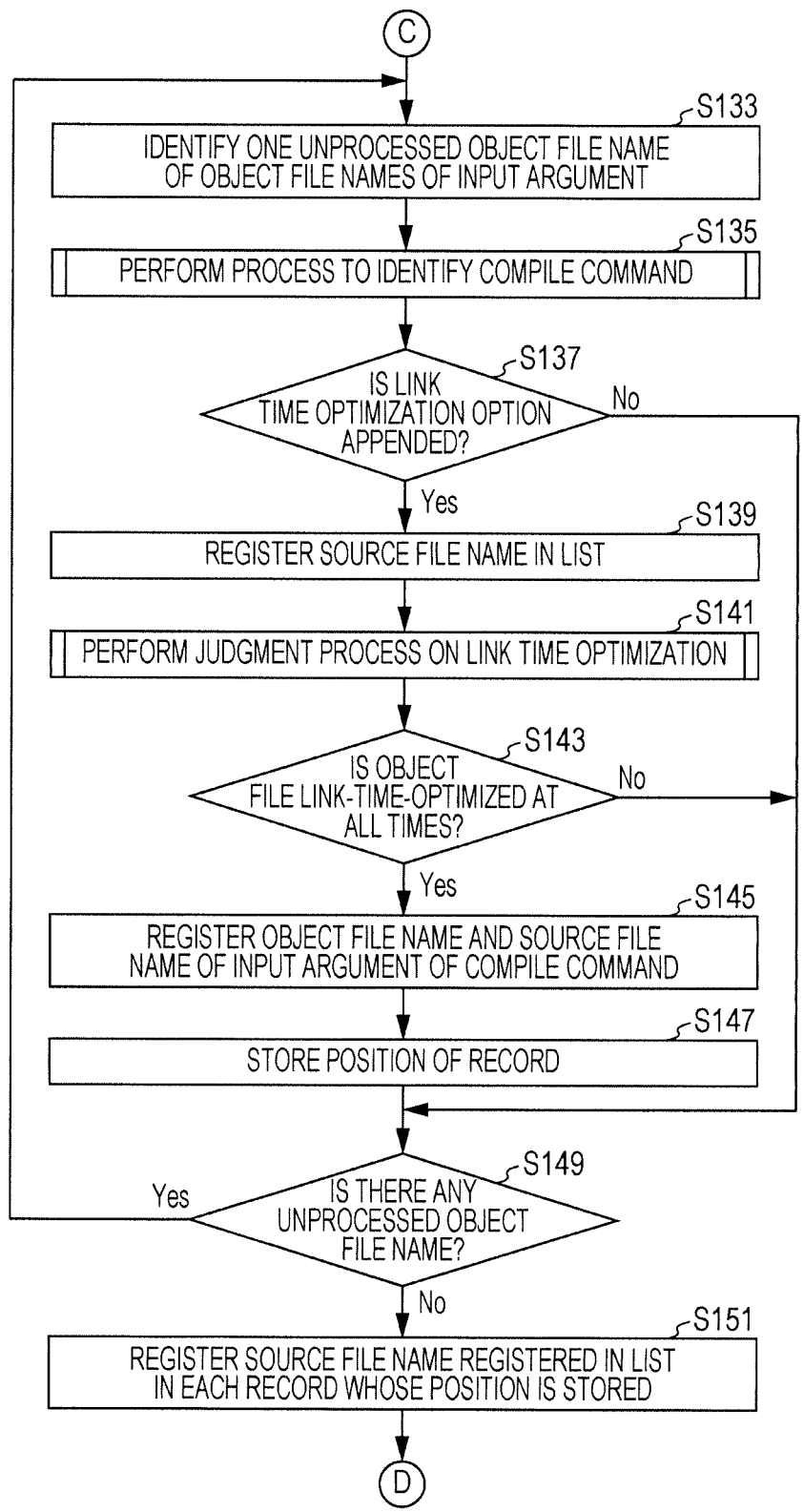
FIG. 24 is a diagram illustrating a processing flow of pre-processing in the second embodiment.

Proceeding to the description of FIG. 24, the LTO object extraction section 10 identifies one unprocessed object file name of object file names of input arguments of the processing target command (FIG. 24: step S133). In the following, an object file having the object file name identified in step S133 is referred to as a processing target object file.

The LTO object extraction section 10 performs a process to identify a compile command (step S135). Since the process to identify a compile command is as described using FIG. 10, a description is omitted here.

The LTO object extraction section 10 judges whether a link time optimization option is appended to the compile command identified in step S135 (step S137).

If the link time optimization option is not appended to the compile command identified in step S135 (step S137: NO), link time optimization is not performed, and thus processing proceeds to step S149.

On the other hand, if the link time optimization option is appended to the compile command identified in step S135 (step S137: YES), the following process is performed. Specifically, the LTO object extraction section 10 registers in a list a source file name that is specified as an input file of the compile command identified in step S135 (step S139).

FIG. 25 illustrates an example of data to be registered in the list. In the example of FIG. 25, source file names are registered.

The LTO object extraction section 10 performs a judgment process on link time optimization (step S141). Since the judgment process on link time optimization is as described using FIG. 11, a description is omitted here.

The LTO object extraction section 10 judges whether a processing target object file is link-time-optimized at all times (step S143).

If the processing target object file is not optimized at all times (step S143: NO), processing proceeds to step S149.

On the other hand, if the processing target object file is optimized at all times (step S143: YES), the LTO object extraction section 10 performs the following processing. Specifically, the LTO object extraction section 10 registers in the data storage section 13 an object file having the object file name identified in step S133, as an object file that is link-time-optimized at all times. In addition, the LTO object extraction section 10 registers in the data storage section 13 a source file name of an input argument of the compile command identified in step S135, as a source file for which compilation (more specifically, first-path compilation) is not desirable (step S145).

The LTO object extraction section 10 stores a position of a record where data is registered in step S145 (step S147), and judges whether there is any unprocessed object file name (step S149).

If there is an unprocessed object file name (step S149: YES), processing returns to step S133 to process a next object file name.

On the other hand, if there is no unprocessed object file name (step S149: NO), the following processing is performed. Specifically, the LTO object extraction section 10 registers the source file name registered in the list in each record whose position is stored in step S147, as an inter-file optimization target source file (step S151). Processing returns to step S123 in FIG. 23 by way of a terminal D.

FIG. 26 illustrates an example of data stored in the data storage section 13. In the example of FIG. 26, a name of an object file on which link time optimization is performed, a name of a source file not desirable to be compiled, a name of a source file which is a target of inter-file optimization, and an execution flag indicating whether or not inter-file optimization is performed during linking are stored. At the time of step S151, a value of the execution flag is set to "0".

If the processing as described above is performed, a source file not desirable to be compiled may be identified. It may also be confirmed through subsequent processing whether or not the source file is a source file for which inter-file optimization is performed.

Next, processing during compilation is described using FIGS. 27 to 31.

Figure 27:
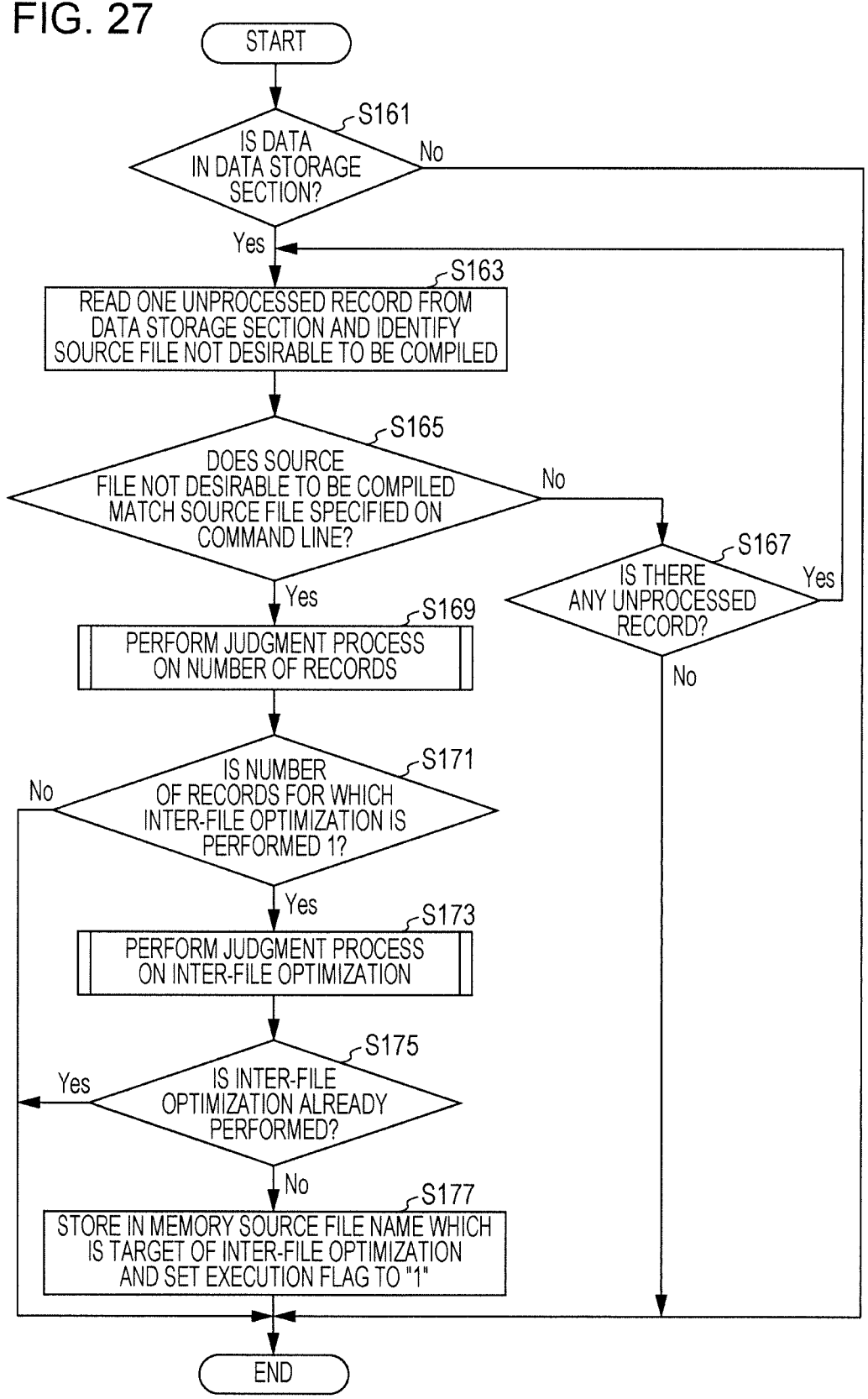
FIG. 27 is a diagram illustrating a processing flow of a process to be performed by a compilation judgment section in the second embodiment.

First, processing to be performed by the compilation judgment section 110 is described using FIGS. 27 to 30. The compilation judgment section 110 judges whether data is stored in the data storage section 13 (FIG. 27: step S161).

If the data is not stored in the data storage section 13 (step S161: NO), processing ends.

If the data is stored in the data storage section 13 (step S161: YES), the compilation judgment section 110 reads one unprocessed record from the data storage section 13. Then, the compilation judgment section 110 identifies a source file not desirable to be compiled that is included in the read record (hereinafter referred to as a processing target source file) (step S163).

The compilation judgment section 110 judges whether the processing target source file matches a source file specified (input from an operator is accepted, for example) on a command line (step S165).

If the processing target source file does not match the source file specified on the command line (step S165: NO), the following processing is performed. Specifically, the compilation judgment section 110 judges whether there is any unprocessed record (step S167).

If there is an unprocessed record (step S167: YES), processing returns to step S163. On the other hand, if there is no unprocessed record (step S167: NO), processing ends.

On the other hand, if the processing target source file matches the source file specified on the command line (step S165: YES), the following processing is performed. Specifically, the compilation judgment section 110 performs a judgment process on the number of records (step S169). The judgment process on the number of records is described using FIG. 28.

Figure 28:
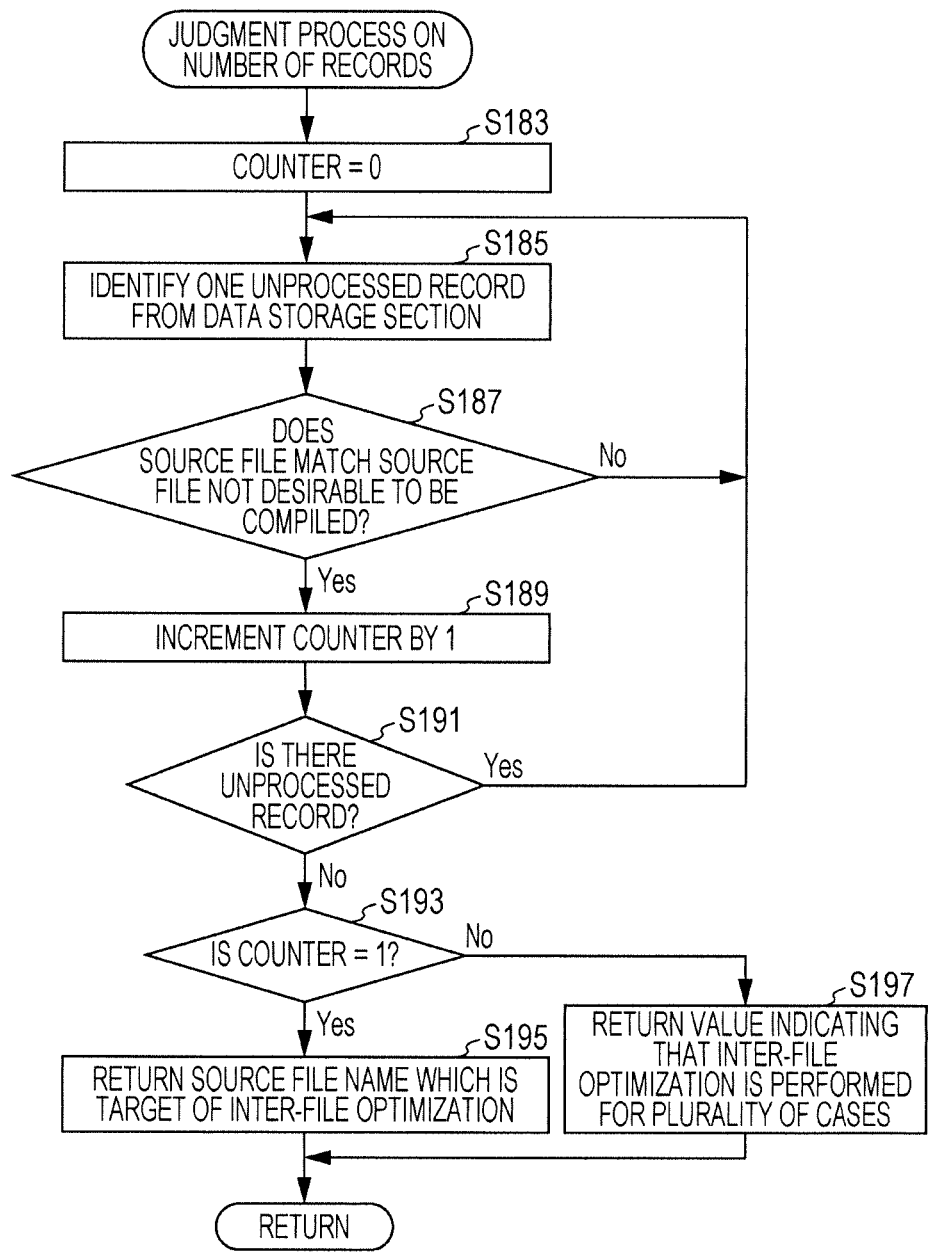
FIG. 28 is a diagram illustrating a processing flow of a judgment process on the number of records.

First, the compilation judgment section 110 sets a value of a counter that counts the number of records to 0 (FIG. 28: step S183).

The compilation judgment section 110 identifies one unprocessed record from the data storage section 13 (step S185).

The compilation judgment section 110 judges whether the processing target source file matches the source file not desirable to be compiled that is included in the record identified in step S185 (step S187).

If the processing target source file does not match the source file not desirable to be compiled (step S187: NO), processing returns to step S185.

On the other hand, if the processing target source file matches the source file not desirable to be compiled (step S187: YES), the compilation judgment section 110 increments the counter value by 1 (step S189).

The compilation judgment section 110 judges whether there is any unprocessed record in the data storage section 13 (step S191). If there is an unprocessed record (step S191: YES), processing returns to step S185.

On the other hand, if there is no unprocessed record (step S191: NO), the compilation judgment section 110 judges whether the value of the counter is 1 (step S193).

If the value of the counter is 1 (step S193: YES), the compilation judgment section 110 reads a source file name targeted for inter-file optimization from a record in which the processing target source file is recorded as a source file not desirable to be compiled, from the data storage section 13. Then, the compilation judgment section 110 returns the read source file name as a return value (step S195). Then, processing returns to the invoking source.

On the other hand, if the value of the counter is not 1 (step S193: NO), the compilation judgment section 110 returns as a return value a value indicating that inter-file optimization is performed on the processing target source file in a plurality of cases (step S197). Then, processing returns to the invoking source.

If the processing as described above is performed, it may be judged whether or not the number of records in which a processing target source file is registered as a source file not desirable to be compiled is 1.

Turning back to the description of FIG. 27, the compilation judgment section 110 judges whether the number of records for which inter-file optimization is performed is 1 (step S171).

If the number of records for which inter-file optimization is performed is not 1 (step S171: NO), processing ends.

On the other hand, if the number of records for which inter-file optimization is performed is 1 (step S171: YES), the compilation judgment section 110 performs a judgment process on inter-file optimization (step S173). The judgment process on inter-file optimization is described using FIG. 29.

Figure 29:
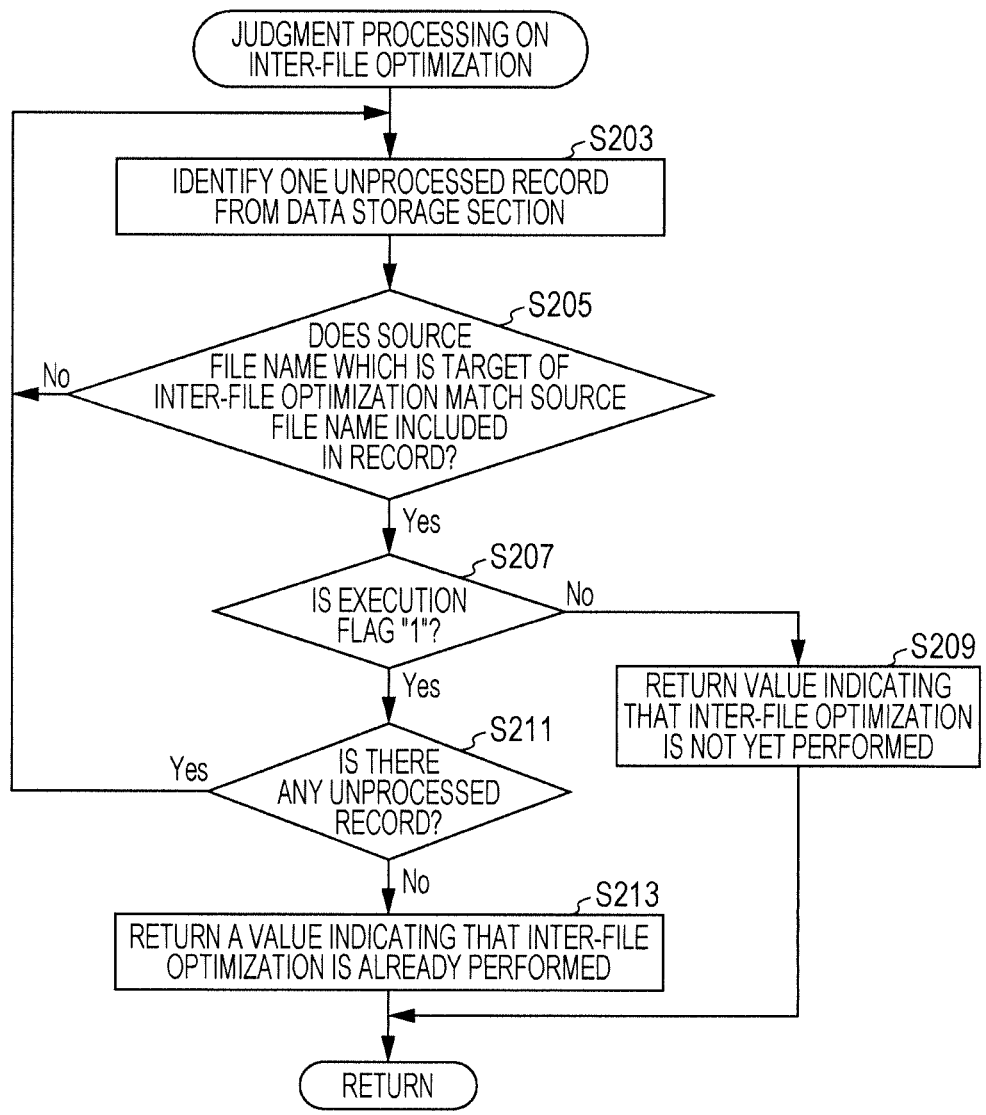
FIG. 29 is a diagram illustrating a processing flow of a judgment process on inter-file optimization.

First, the compilation judgment section 110 identifies one unprocessed record from the data storage section 13 (FIG. 29: step S203).

The compilation judgment section 110 judges whether the source file name read out in step S195 matches a source file name registered as a target of inter-file optimization in the record identified in step S203 (step S205).

If the source file name read out in step S195 does not match the source file name registered as a target of inter-file optimization in the record identified in step S203 (step S205: NO), processing returns to step S203.

On the other hand, if the source file name read out in step S195 matches the source file name registered as a target of inter-file optimization in the record identified in step S203 (step S205: YES), the following processing is performed. Specifically, the compilation judgment section 110 judges whether an execution flag of the record identified in step S203 is "1" (step S207).

If the execution flag of the record identified in step S203 is not "1" (is "0", more specifically) (step S207: NO), the compilation judgment section 110 returns as a return value a value indicating that inter-file optimization is not yet performed (step S209). Then, processing returns to the invoking source.

On the other hand, if the execution flag identified in step S203 is "1" (step S207: YES), the compilation judgment section 110 judges whether there is any unprocessed record (step S211).

If there is an unprocessed record (step S211: YES), processing returns to step S203. On the other hand, if there is no unprocessed record (step S211: NO), the following processing is performed. Specifically, the compilation judgment section 110 returns as a return value a value indicating that inter-file optimization is already performed (step S213). Then, processing returns to the invoking source.

If the processing as described above is performed, it may be judged whether or not inter-file optimization is already performed.

Turning back to the description of FIG. 27, based on a processing result in step S173, the compilation judgment section 110 judges whether inter-file optimization is performed on the processing target source file (step S175).

If inter-file optimization is already performed on the processing target source file (step S175: YES), processing ends.

On the other hand, if inter-file optimization is not yet performed on the processing target source file (step S175: NO), the following processing is performed. Specifically, the compilation judgment section 110 stores a source file name of the processing target source file in the memory. In addition, for the processing target source file, the compilation judgment section 110 sets an execution flag stored in the data storage section 13 to "1" (step S177). Then, processing ends.

FIG. 30 illustrates an example of data stored in the data storage section 13 when processing of step S177 ends. In the example of FIG. 30, a name of an object file on which link time optimization is performed, a name of a source file name not desirable to be compiled, a name of a source file which is a target of inter-file optimization, and an execution flag indicating whether or not inter-file optimization is performed during linking are stored. In the example of FIG. 30, in subsequent processing, inter-file optimization is performed on source files not desirable to be compiled "b.c" and "c.c" for which the execution flag "1" is set.

Figure 31:
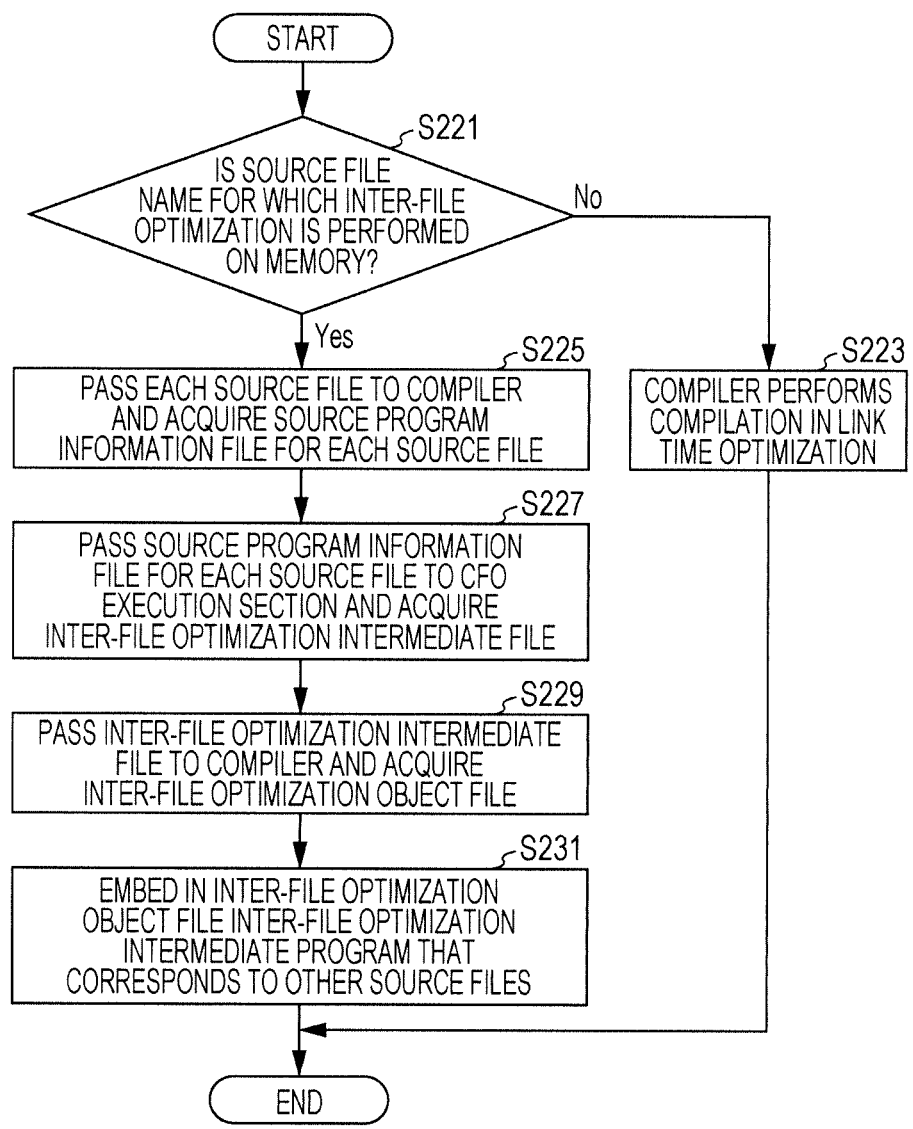
FIG. 31 is a diagram illustrating a processing flow of a process to be performed by a compilation control section in the second embodiment.

Processing to be performed by the compilation control section 111 is described using FIG. 31. The compilation control section 111 judges whether a source file name is stored in the memory through processing of step S177 (FIG. 31: step S221).

If the source file name is not stored in the memory (step S221: NO), the following process is performed. Specifically, the compilation control section 111 instructs the compiler 14 to perform compilation on the source file. In response to this, the compiler 14 performs compilation on the source file to generate an object code (step S223). Then, processing ends.

On the other hand, if the source file name is stored in the memory (step S221: YES), the compilation control section 111 passes each source file to the compiler 14 and acquires a source program information file on each source file (step S225).

The compilation control section 111 passes the source program information file on each source file to the CFO execution section 15 and acquires an inter-file optimization intermediate file (step S227).

The compilation control section 111 passes to the compiler 14 an inter-file optimization intermediate file corresponding to a source file name specified on a command line, of inter-file optimization intermediate files acquired in step S227 and acquires an inter-file optimization object file (step S229).

The compilation control section 111 embeds an inter-file optimization intermediate program acquired in step S227 and corresponding to other source files, in the inter-file optimization object file acquired in step S229 (step S231). Then, processing ends.

For example, if source files which are a target of inter-file optimization are "a.c" and "b.c", and a source file name specified on a command line is "a.c", an inter-file optimization object file is generated for "a.c". Then, an inter-file optimization intermediate program for "b.c" is embedded in that inter-file optimization object file.

If the processing as described above is performed, inter-file optimization is performed during compilation, and generation of an object code is also omitted for some source files.

Figure 32:
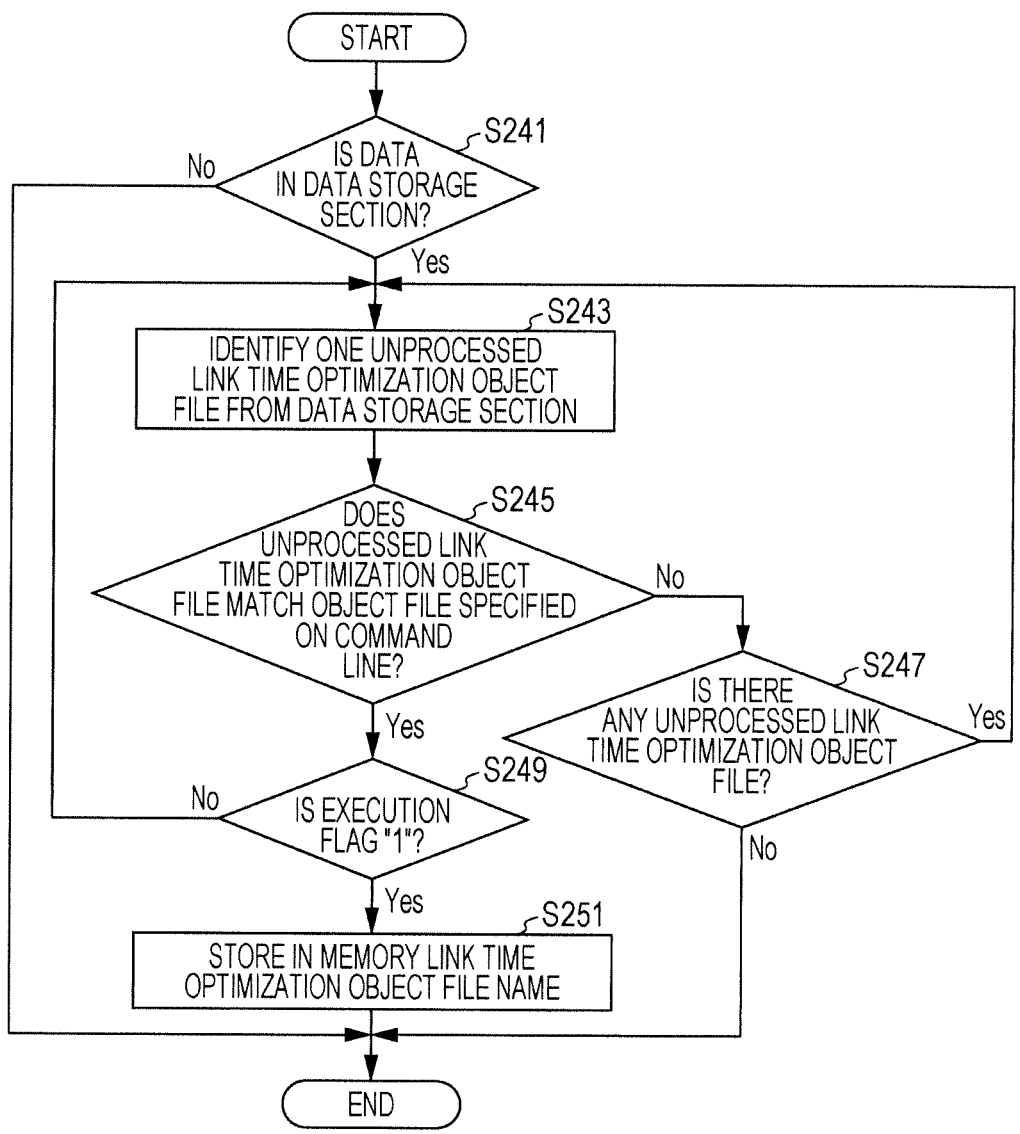
FIG. 32 is a diagram illustrating a processing flow of a process to be performed by a CFO judgment section.

Next, processing during linking is described using FIGS. 32 to 34.

First, processing to be performed by the CFO judgment section 112 is described. The CFO judgment section 112 judges whether data is stored in the data storage section 13 (FIG. 32: step S241).

If the data is not stored in the data storage section 13 (step S241: NO), processing ends.

On the other hand, if the data is stored in the data storage section 13 (step S241: YES), the CFO judgment section 112 identifies one unprocessed object file from the data storage section 13, of object files on which optimization is performed during linking (step S243).

The CFO judgment section 112 judges whether an object file specified on a command line matches the object file identified in step S243 (step S245).

If the object file specified on the command line does not match the object file identified in step S243 (step S245: NO), the following processing is performed. Specifically, the CFO judgment section 112 judges whether there is any unprocessed object file, of the object files that are stored in the data storage section 13 and on which link time optimization is performed (step S247).

If there is an unprocessed object file (step S247: YES), processing returns to step S243. If there is no unprocessed object file (step S247: NO), processing ends.

On the other hand, if the object file specified on the command line matches the object file identified in step S243 (step S245: NO), the following processing is performed. Specifically, the CFO judgment section 112 judges whether an execution flag corresponding to the record identified in step S243 is "1" (step S249).

If the execution flag corresponding to the record identified in step S243 is not "1" (step S249: NO), processing returns to step S243.

On the other hand, if the execution flag corresponding to the record identified in step S243 is "1" (step S249: YES), the CFO judgment section 112 stores in the memory an object file name of the object file identified in step S243 (step S251). Then, processing ends.

FIG. 33 illustrates an example of data to be stored in the memory through processing in step S251. In the example of FIG. 33, of object files that are specified on a command line and to be optimized during linking, an object file name of the inter-file optimization object file in which the inter-file optimization intermediate program is embedded in step S231 is stored.

Processing to be performed by the CFO control section 113 is described using FIG. 34. First, the CFO control section 113 judges whether of object files on which link time optimization is performed, the object file name of the inter-file optimization object file in which the inter-file optimization intermediate program is embedded in step S231 is stored in the memory (step S261).

If of the object files on which link time optimization is performed, the object file name of the inter-file optimization object file in which the inter-file optimization intermediate program is embedded in step S231 is stored in the memory (step S261: YES), the following processing is performed. Specifically, the CFO control section 113 retrieves the inter-file optimization intermediate program from the inter-file optimization object file in which the inter-file optimization intermediate program is embedded in step S231, of the object files on which optimization is performed during linking. Then, the CFO control section 113 outputs the retrieved inter-file optimization intermediate program to the inter-file optimization intermediate file (step S263).

The CFO control section 113 causes the compiler 14 to perform the following processing. Specifically, the compiler 14 generates an inter-file optimization object file with the inter-file optimization intermediate file generated through processing in step S263 as input (step S265).

The CFO control section 113 causes the linker 16 to perform the following processing. Specifically, the linker 16 generates an executable file with the inter-file optimization object file from which the inter-file optimization intermediate program is retrieved in step S263 and the inter-file optimization object file generated in step S265 as input (step S267). Then, processing ends.

On the other hand, if the object file name of the object file on which optimization is performed during linking is not stored in the memory (step S261: NO), the CFO control section 113 causes the CFO execution section 15 to perform the following processing. Specifically, the CFO execution section 15 generates an inter-file optimization intermediate file for the source program information embedded in the object file specified on the command line (step S269).

The CFO control section 113 causes the compiler 14 to perform the following processing. Specifically, the compiler 14 generates an inter-file optimization object file from the inter-file optimization intermediate file generated in step S269 (step S271).

The CFO control section 113 causes the linker 16 to perform the following processing. Specifically, the linker 16 links the inter-file optimization object file generated in step S271 to generate an executable file (step S273). Then, processing ends.

If the processing as described above is performed, the process to generate an object code from a source file during compilation (more specifically, the first-path compilation) is omitted, which thus allows time taken to complete broad-sense compilation to be shortened.

Omission of compilation in the second embodiment is specifically described using FIG. 35. Now, a command sequence including the commands illustrated in (1) to (9) of FIG. 18 is taken as an example. Then, FIG. 35 illustrates comparison of source files for which an object code is generated when each command illustrated in FIG. 18 is executed.

For "x.exe", in the case of normal compilation and linking, object codes are generated for an inter-file optimization intermediate program corresponding to "a.c", "b.c", and "a.c" and an inter-file optimization intermediate program corresponding to "b.c". On the other hand, according to the second embodiment, object codes are generated for an inter-file optimization intermediate program corresponding to "a.c", "a.c" and an inter-file optimization intermediate program corresponding to "b.c". Therefore, the number is decreased from 4 to 3.

For "y.exe", in the case of normal compilation and linking, object codes are generated for an inter-file optimization intermediate program corresponding to "a.c", "c.c", and "a.c" and an inter-file optimization intermediate program corresponding to "c.c". On the other hand, according to the second embodiment, object codes are generated for an inter-file optimization intermediate program corresponding to "a.c", "a.c" and an inter-file optimization intermediate program corresponding to "c.c". Therefore, the number is decreased from 4 to 3.

For "z.exe", in the case of normal compilation and linking, object codes are generated for an inter-file optimization intermediate program corresponding to "a.c", "d.c", and "a.c". On the other hand, according to the second embodiment, object codes are generated for an inter-file optimization intermediate program corresponding to "a.c", "d.c", and "a.c". Therefore, the numbers of both cases are same.

For "w.exe", in the case of normal compilation and linking, object codes are generated for "d.c" and "e.c". On the other hand, according to the second embodiment, object codes are generated for "d.c", "e.c". Therefore, the numbers of both cases are same.

Here, for a case in which the data illustrated in FIG. 6 is stored in the data storage section 13, the operations of the second embodiment are described more specifically.

First, a makefile command sequence is generated through a dry run. If a compile or link command "fcc" is detected, the option "-c" is not appended, and the extension of the input file is ".o", the command is a link command. The following processing is performed on that link command.

First, it is confirmed through a character-string comparison of the command and "-Klto" that the option "-Klto" is appended to the link command "fcc a.o b.o -o x.exe -Klto".

For "a.o" of the object files of the input arguments of the object files "a.o" and "b.o" of the link command, "fcc a.c -o a.o -c -Klto" is detected as a compile command to which the option "-c" is appended, for which the extension of the input file is defined according to the language specifications, and "a.o" is appended following the option "-o" as an output file, or only the extension of the input file and an extension of the output file are different. Here, it is confirmed through a character-string comparison of the command and "-Klto" that the option "-Klto" is appended to the compile command. Then, it is judged whether linking is performed on "a.o" at all times after link time optimization is performed, as described below. Specifically, in the makefile command sequence are present "fcc a.o b.o -o x.exe -Klto", "fcc a.o c.o -o y.exe -Klto", and "fcc a.o d.o -o z.exe -Klto" as a link command for which an input file is "a.o". It is confirmed through a character-string comparison of the command and "-Klto" that the option "-Klto" is appended to the command "fcc" for which an input file is "a.o". With this, it is judged that "a.o" is optimized during linking at all times. Accordingly, "a.o" is registered in the data storage section 13 as an object file that is optimized during linking at all times. In addition, "a.c" of an input argument of a compile command for which "a.o" is specified as an output file is registered as a source file not desirable to be compiled.

On the other hand, for "b.o" of the object files "a.o" and "b.o" of the input arguments of the link command, "fcc b.c -o b.o -c -Klto" is detected as a compile command to which the option "-c" is appended, for which the extension of the input file is defined according to the language specifications, and "b.o" is appended following the option "-o" as an output file, or only the extension of the input file and the extension of the output file are different. Here, it is confirmed through a character-string comparison of the command and "-Klto" that the option "-Klto" is appended to the compile command. In addition, it is confirmed through a character-string comparison of the command and "-Klto" that as a link command for which the input file is "b.o", "fcc a.o b.o -o x.exe -Klto" is detected, has the option "-Klto" appended, and is optimized during linking. Accordingly, "b.o" is registered in the data storage section 13 as an object file that is optimized during linking at all times. In addition, "b.c" of the input argument of the compile command for which "b.o" is specified as an output file is registered as a source file not desirable to be compiled.

Then, for both of a record of "a.o" and a record of "b.o", "a.c b.c", which is a source file corresponding to "x.exe" for which the link time optimization option is appended to the compile command, is registered as a source file that is a target of inter-file optimization.

Then, it is confirmed through a character-string comparison of the command and "-Klto" that the option "-Klto" is appended to the link command "fcc a.o c.o -o y.exe -Klto".

It is confirmed with the procedure similar to the above that link time optimization is performed at all times on "a.o" of the object files "a.o" and "c.o" of the input arguments of the link command. Accordingly, a new record of "a.o" is registered in the data storage section 13. In addition, "a.c", which is an input argument of the compile command for which "a.o" is specified as an output file, is registered as a source file not desirable to be compiled.

On the other hand, for "c.o" of the object files "a.o" and "c.o" of the input arguments of the link command, "fcc c.c -o c.o -c -Klto" is detected as a compile command to which the option "-c" is appended, and for which the extension of the input file is defined according to the language specifications, "c.o" is appended following the option "-o" as an output file, or only the extension of the input file and the extension of the output file are different. It is confirmed through a character-string comparison of the command and "-Klto" that the option "-Klto" is appended to the compile command. In addition, it is confirmed through a character-string comparison of the command and "-Klto" that as a command for which the input file is "c.o", "fcc a.o c.o -o y.exe -Klto" is detected, has the option "-Klto" appended, and is optimized during linking. Accordingly, a new record of "c.o" is registered in the data storage section 13. In addition, "c.c" which is the input argument of the compile command for which "c.o" is specified as an output file is registered as a source file not desirable to be compiled. Then, for both of a record of "a.o" and a record of "c.o" that are added, "a.c c.c", which is a source file corresponding to "y.exe" for which the link time optimization option is appended to the compile command, is registered as a source file that is a target of inter-file optimization.

Then, it is confirmed through a character-string comparison of the command and "-Klto" that the option "-Klto" is appended to the link command "fcc a.o d.o -o z.exe -Klto".

It is confirmed with the procedure similar to the above that link time optimization is performed at all times on "a.o" of the object files "a.o" and "d.o" of the input arguments of the link command. Accordingly, a new record of "a.o" is registered in the data storage section 13. In addition, "a.c", which is an input argument of the compile command for which "a.o" is specified as an output file, is registered as a source file not desirable to be compiled.

On the other hand, for "d.o" of the object files "a.o" and "d.o" of the input arguments of the link command, "fcc d.c -o d.o -c" is detected as a compile command to which the option "-c" is appended, for which the extension of the input file is defined according to the language specifications, and "d.o" is appended following the option "-o" as an output file, or the extension of the input file and the extension of the output file are only different. However, the option "-Klto" is not appended to the compile command. Accordingly, no record is added to the data storage section 13. Then, for a record of "a.o" that is added, "a.c", which is a source file corresponding to "z.exe" for which the link time optimization option is appended to the compile command, is registered as a source file that is a target of inter-file optimization.

Lastly, it is confirmed through a character-string comparison of the command and "-Klto" that the option "-Klto" is not appended to a link command "fcc d.o e.o -o w.exe". Accordingly, no processing is performed on this link command.

If the processing as described above is performed, the data storage section 13 is in a state illustrated in FIG. 26.

Processing during compilation and processing during linking are described in the following.

During compilation, if compilation of a source file is not desirable, the number of records for that source file is 1, and inter-file optimization is not yet performed, a source file, which is a target of inter-file optimization corresponding to that source file (here, referring to a source file on which inter-file optimization is performed) is stored. For example, while the number of records including "a.c" as a source file not desirable to be compiled is 3, the number of records including "b.c" as a source file not desirable to be compiled is 1. Therefore, when "b.c" is compiled, "a.c b.c" is stored as a source file name that is a target of inter-file optimization. Inter-file optimization is performed on the stored source file that is a target of inter-file optimization and an inter-file optimization intermediate program is generated. Compilation is performed on the inter-file optimization intermediate program, and an inter-file optimization object file is generated. For example, if a source file that is a target of inter-file optimization is "a.c b.c", compilation of "b.c" itself is not performed, and an object file "b.o" is generated through compilation of the inter-file optimization intermediate program corresponding to "b.c". In addition, the inter-file optimization intermediate program corresponding to "a.c" is embedded in the object file "b.o".

During linking, if an object file specified by an argument is an object file to be optimized during linking and link time optimization is not yet performed, a name of that object file is stored in the memory. For example, "b.o" specified by an argument is an object file to be optimized during linking and link time optimization is not yet performed, "b.o" is stored in the memory. Then, an inter-file optimization intermediate program corresponding to other source file that is embedded in the inter-file optimization object file "b.o" and that is a target of inter-file optimization is compiled and an inter-file optimization object file is generated. Then, an executable file is generated through linking of the inter-file optimization object file of "b.o" and other inter-file optimization object file.

While one embodiment of the present disclosure is described above, the present disclosure is not limited to this. For example, a functional block configuration of the information processor 1 as described above may not match an actual program module configuration.

In addition, the data configuration described above is an example, and this does not mean that such a configuration is desirable. Furthermore, in the processing flow, it is also possible to change the order of processes as far as processing results remain unchanged. Furthermore, steps may be performed in parallel.

Figure 36:
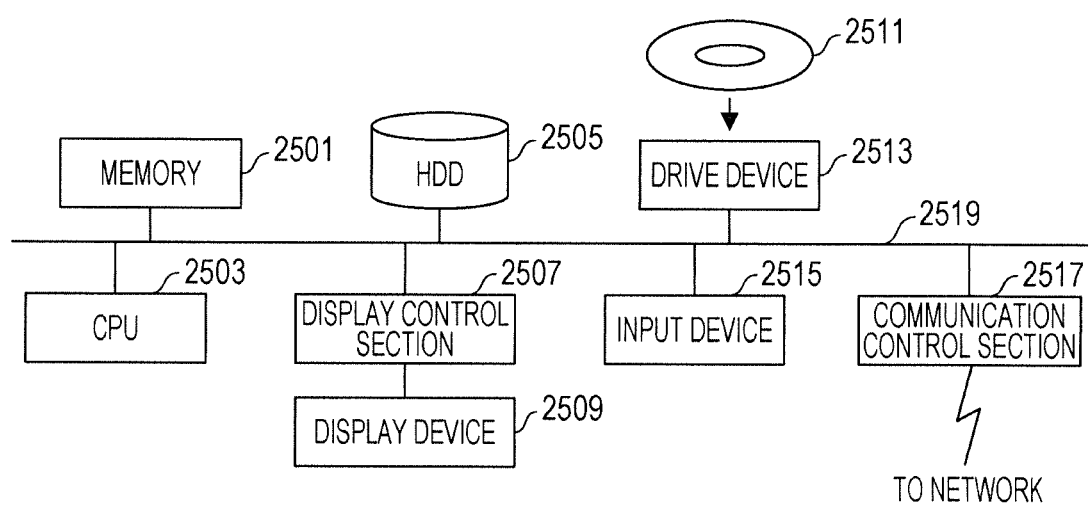
FIG. 36 is a functional block diagram of a computer.

Note that the information processor 1 described above is a computer device. As illustrated in FIG. 36, a memory 2501, a central processing unit (CPU) 2503, a hard disk drive (HDD) 2505, a display control section 2507 connected to a display device 2509, a drive device 2513 for a removable disk 2511, an input device 2515, and a communication control section 2517 for network connection are connected via a bus 2519. An operating system (OS) and an application program to implement the processing in this embodiment are stored in HDD 2505, and read from HDD 2505 to the memory 2501 when executed by the CPU 2503. The CPU 2503 controls the display control section 2507, the communication control section 2517, and the drive device 2513 to cause the display control section 2507, the communication control section 2517, and the drive device 2513 to perform a predetermined operation, depending on processing content of the application program. In addition, while data being processed is mainly stored in the memory 2501, the data may be stored in the HDD 2505. In the embodiment of the present disclosure, an application program to perform the processing described above is stored and distributed in a computer readable removable disk 2511 and installed in the HDD 2505 from the drive device 2513. An application program may be installed in the HDD 2505 by way of a network such as Internet and the communication control section 2517. Hardware and the OS such as the CPU 2503, the memory 2501 or the like as described above and a program such as an application program organically working together, such a computer device implements various types of functions described above.

A summary of the embodiments of the present disclosure described above is as follows.

A program generation method according to a first aspect of this embodiment includes processes to (A) identify a first object file which is an object file in a link command to which a first option to perform link time optimization is appended, from command data including a plurality of commands to generate an executable program and (B) store identification information of the first object file in a data storage section (a storage) if an input file is the first object file and the first option is appended to each of one or more link commands included in the command data.

Doing so enables identification of a file that is an object file generated in compilation performed prior to link time optimization and that is not linked.

In addition, the above-described program generation method may further include a process to (C) cause a compiler to perform a process to generate a second object file from a source file which is other than a first source file corresponding to the first object file stored in the data storage section. For an object file to be linked, it becomes possible to generate an object file as usual.

In addition, the above-described program generation method may further include processes to (D) cause the compiler to perform a process to generate a first object file and a third object file from intermediate files generated through inter-file optimization on the first source file and any source file other than the first source file, and (E) cause the linker to perform a process to link the first object file and the third object file. Then, build may be completed while omitting compilation before link time optimization is performed, for some source files. This allows time till a build is complete to be shortened.

In addition, in the process to identify the first object file, (a1) a link command is identified that meets conditions that a command name is a predetermined command name, that a second option indicating that a command is a compile command, and that an extension of an input file of the command is a predetermined extension, and (a2) the first object file is identified from the identified link command. Identification of a first object file from a command other than a link command may be avoided.

In addition, in the process to store identification information of the first object file in the data storage section, (b1) it may be judged whether a command whose name is a predetermined command name, for which an input file is a first object file, and to which the first option and the second option are not appended is included in command data. It may be efficiently judged if the first option is appended to each of one or more link commands.

In addition, in the process to store identification information of the first object file in the data storage section, (b2) from the command data, a compile command is identified that meets conditions that a command name is a predetermined command name, that a second option indicating that the command is a compile command is appended, an extension of an input file is a predetermined extension, and that an output file is the first object file or any part other than an extension of the first object file and any part other than an extension of the input file match, and (b3) if the first option is appended to the identified compile command, it may be judged whether a command for which the input file is the first object file and to which the first option and the second option are not appended is included in the command data. If the first option is appended to both the compile command and the link command, link time optimization may be performed. Doing as described above makes it possible to confirm that the first option is appended to the compile command to output the first command.

In addition, the above-described program generation method may further include processes to (F) cause the compiler to perform a process to perform inter-file optimization on a first source file to generate a first intermediate file and generate a first object file from the generated first intermediate file during the first compilation, if the number of times of inter-file optimization to be performed on the first source file corresponding to the first object file is a predetermined number and if inter-file optimization is not yet performed on the first source file; (G) perform inter-file optimization on a second source file on which inter-file optimization is performed as well as on the first source file, to generate a second intermediate file, and embed in the first object file an intermediate program included in the generated second intermediate file, and (H) cause the compiler to perform a process to retrieve the intermediate program included in the first object file to generate a third object file and cause the linker to perform a process to link the first object file and the third object file. Since the process to generate a first object from a first source file is omitted, time to complete linking may be reduced.

In addition, the above-described program generation method may further include a process to (I) generate command data through a dry run of a predetermined command. Command data may be generated without actually performing compilation.

In addition, the predetermined number may be 1.

A compilation method according to a second aspect of this embodiment includes processes to (J) judge whether identification information of a first source file specified as a target of compilation is stored in the data storage section that stores identification information of a source file corresponding to an object file that is not linked; (K) generate an object file through compilation on a source file other than the first source file if the identification information of the first source file is stored in the data storage section; (L) perform inter-file optimization on the first source file and the source file other than the first source file to generate a plurality of intermediate files; and (M) generate a plurality of object files through compilation on the plurality of generated intermediate files.

Since compilation on the first source file may be omitted, the time taken for a build may be shortened.

According to the embodiment, by judging whether an option to perform link time optimization is appended to all link commands that take a certain object file as input, it may be identified if that object file itself is linked.

Note that a program to cause a computer to perform processing with the above method may be created, and the program is stored in, for example, a computer readable storage medium or a storage device, such as a flexible disk, a CD-ROM, a magneto-optic disk, semiconductor memory, a hard disk or the like. Note that intermediate processing results are temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processor comprising:
a memory; and
a processor coupled to the memory and the processor configured to:
store first identification information of a first source file corresponding to an object file that is not linked;
judge whether second identification information of a second source file specified as a target of compilation is stored in the memory,
generate an object file through compilation on a third source file other than the second source file where the second identification information of the second source file is judged as being stored in the memory,
perform inter-file optimization on the second source file and the third source file to generate a plurality of intermediate files;
generate a plurality of object files through compilation on the plurality of intermediate files and generate an executable file linking the object file of the first source file according to a result of the inter-file optimization, and
execute a compiler to perform a process of inter-file optimization on the first source file to generate a first intermediate file and generate a first object file from the generated first intermediate file during compilation of the first source file,
when a number of times of inter-file optimization to be performed on the first source file corresponding to the first object file is a predetermined number and when inter-file optimization is not yet performed on the first source file,
wherein compilation of the first source file before the process of the inter-file optimization is omitted.

2. A non-transitory, computer-readable recording medium having stored therein a program for causing a computer to execute a process, the process comprising:
identifying, from command data including a plurality of commands to generate an executable program, a first object file that is an object file in a link command to which an option to perform link-time optimization is appended;
storing identification information of the first object file in a storage, when an input file is the first object file and the option is appended to each of one or more link commands included in the command data;
generating a second object file from a second source file other than a first source file corresponding to the first object file stored in the storage;
causing a compiler to perform a process to generate the first object file and a third object file from an intermediate file generated through inter-file optimization on the first source file and the second source file;

causing a linker to perform a process to link the first object file and the third object file; and execute the compiler to perform a process to perform inter-file optimization on the first source file to generate a first intermediate file and generate the first object file from the generated first intermediate file during first compilation, when a number of times of inter-file optimization to be performed on the first source file corresponding to the first object file is a predetermined number and when inter-file optimization is not yet performed on the first source file, wherein compilation of the first source file before the process of the inter-file optimization is omitted.

3. The non-transitory, computer readable recording medium according to claim 2, wherein the option is a first option, and in the process to identify the first object file, a link command is identified that meets conditions that a command name is a predetermined command name, that a second option for indicating that the command is a compile command is not appended, and that an extension of an input file of the command is a predetermined extension; and the first object file is identified from the identified link command.

4. The non-transitory, computer readable recording medium according to claim 2, wherein the option is a first option, and in the process to store the identification information of the first object file in the storage, judging whether a command whose command name is a predetermined command name, for which an input file is the first object file, and to which the first option and the second option are not appended is included in the command data.

5. The non-transitory, computer readable recording medium according to claim 4, wherein the option is a first option, and in the process to store the identification information of the first object file in the storage, from the command data, a compile command is identified that meets conditions that a command name is the predetermined command name, that a second option for indicating that the command is a compile command is appended, that an extension of an input file of the command is a predetermined extension, and that an output file of the command is the first object file or any part other than an extension of the first object file matches any part other than an extension of the input file; and when the first option is appended to the identified compile command, it is determining whether a command for which an input file is the first object file and to which the first option and the second option are not appended is included in the command data.

6. The non-transitory, computer readable recording medium according to claim 2, causing the computer to further perform processes to:

perform inter-file optimization on the third source file on which inter-file optimization is performed as well as on the first source file to generate a second intermediate file, and embed in the first object file an intermediate program included in the generated second intermediate file; and cause the compiler to perform a process to retrieve the intermediate program included in the first object file to generate the third object file, and the linker to link the first object file and the third object file.

7. The non-transitory, computer readable recording medium according to claim 2, causing the computer to further perform processes to:

generate the command data through a dry run of a predetermined command.

8. The non-transitory, computer readable recording medium according to claim 7, wherein the predetermined number is 1.

9. A program generation method executed by a computer, the method comprising:

identifying, an object file in a link command to which an option to perform link-time optimization is appended, from command data including a plurality of commands to generate an executable program;

storing identification information of the object file in a storage where an input file is the object file and the option is appended to at least one of link commands included in the command data; and execute a compiler to perform a process to perform inter-file optimization on a source file to generate an intermediate file and generate an object file from the generated intermediate file during compilation, when a number of times of inter-file optimization to be performed on the source file corresponding to the object file is a predetermined number and when inter-file optimization is not yet performed on the source file, wherein a compilation before the link-time optimization is performed is omitted according to the identification information of the object file stored.

* * * * *